(12) United States Patent
Pantel

(10) Patent No.: US 9,335,901 B1
(45) Date of Patent: May 10, 2016

(54) GRID-BASED USER INTERFACE SYSTEM

(71) Applicant: Workday, Inc., Pleasanton, CA (US)

(72) Inventor: Christian Robert Pantel, Winnipeg (CA)

(73) Assignee: Workday, Inc., Pleasanton, CA (US)

( * ) Notice: Subject to any disclaimer, the term of this patent is extended or adjusted under 35 U.S.C. 154(b) by 450 days.

(21) Appl. No.: 13/767,063

(22) Filed: Feb. 14, 2013

(51) Int. Cl.
*G06F 3/048* (2013.01)
*G06F 3/0484* (2013.01)
*G06F 3/0486* (2013.01)

(52) U.S. Cl.
CPC ............ *G06F 3/0484* (2013.01); *G06F 3/0486* (2013.01)

(58) Field of Classification Search
CPC ... G06F 3/0486; G06F 17/245; G06F 17/246; G06F 3/0482; G06F 3/0481
USPC .................................. 715/227, 769, 771, 825
See application file for complete search history.

(56) References Cited

U.S. PATENT DOCUMENTS

| | | | |
|---|---|---|---|
| 2008/0005699 A1* | 1/2008 | Dvorak et al. ................ 715/836 |
| 2010/0058214 A1* | 3/2010 | Singh et al. ................... 715/769 |
| 2011/0283234 A1* | 11/2011 | Takaki .......................... 715/825 |
| 2014/0181628 A1* | 6/2014 | Hogan et al. .................. 715/227 |

* cited by examiner

*Primary Examiner* — Haoshian Shih
(74) *Attorney, Agent, or Firm* — Van Pelt, Yi & James LLP

(57) ABSTRACT

A system for displaying data comprises an interface and a processor. The interface is configured to receive an indication of a matrix element for expansion. The processor is configured to provide a matrix for display. The matrix includes a plurality of matrix elements. The processor is configured to provide a modified matrix for display, in the event that the matrix element is selected for expansion. The modified matrix for display includes a matrix element expanded and matrix elements compressed based at least in part on the matrix element selected.

20 Claims, 29 Drawing Sheets

| Employees | | |
|---|---|---|
| Name | Potential | Performance |
| Adam Carlton | Medium | Medium |
| Allison Hunter | High | Low |
| Alvin Hwang | High | High |
| Amanda Baker | Medium | High |
| Andrea Hillis | Low | Low |
| Luciana Duarte | High | High |
| Lucy Collins | Medium | High |
| Marc Johansson | Low | Low |
| Margaret Granger | Medium | High |
| Mark Navarro | High | High |
| Matt Eklund | High | High |
| Meg Saunders | Medium | Medium |
| Michael McCarthy | Medium | Medium |
| Michael Yang | Low | High |
| Mitch Zimmerman | Low | High |
| Monica Ang | Low | High |
| Nathan Moore | Medium | High |
| Neal Jackson | Medium | Medium |
| Nikhil Rao | Low | Low |
| Nisha Malik | Low | Low |
| Norman Chan | Medium | Low |
| Oliver Reynolds | High | Medium |
| Oscar Bell | High | Low |
| Patrick O'Brien | Low | High |

Total 46

| Organizations | | Low | Medium | High |
|---|---|---|---|---|
| ☐ Property Management | High | Workers 4<br><br>Michael Yang<br>... | Contributors 4<br><br>Amanda Baker<br>... | Stars 4<br><br>Alvin Hwang<br>... |
| ☐ Internal Systems | Medium | Blockers 0 | Transitionals 10<br><br>Adam Carlton<br>... | Emergers 1<br><br><br>Oliver Reynolds |
| ☐ Product Development | Low | Detractors 4<br><br>Andrea Hillis<br>... | Placeholders 1<br><br>Norman Chan | Latents 2<br><br>Allison Hunter<br>... |
| Management Level | | Low | Medium | High |
| ☐ Individual Contributor | | | Potential | |
| ☐ Supervisor | | | | |
| ☐ Manager | | | | |
| ☐ Director | | | | |

(Performance on y-axis: Low, Medium, High)

Unplotted 22

| | | |
|---|---|---|
| Anthony Rizzo | Charles Lewis | Joey Kowalski |
| Betty Liu | Christine Nguyen | John Chen |
| Boris Muller | Darryl Parker | Jonathan Mai |
| Brad Harper | Elsa Ramos | Jordan Hsia |
| Camilla Stewart | Enrique Vasquez | Keith Barnes |
| Carlos Alves | Eric Lazlo | Kelley Crawford |
| Carol Abbot | George Harris | |
| Catherine Gibson | Henry Lynch | |

| Poor 5 | Acceptable 4 | Meets 2 | Exceeds 6 | Outstanding 2 |
|---|---|---|---|---|
| Luciana Duarte Mark Navarro ... | Lucy Collins Margaret Granger ... | Mitch Zimmerman Monica Ang | Adam Carlton Meg Saunders ... | Allison Hunter Oscar Bell |
| Limited | Basic | Proficient | Advanced | Expert |

Skills

Fig. 7

GRID-BASED USER INTERFACE SYSTEM

BACKGROUND OF THE INVENTION

A business manager is often interested in viewing sorted or grouped business information. For example, he might want to see all of his clients grouped into categories based on total amount billed, or his employees grouped by performance. The manager might be able to build a report into his business software to show the desired groupings, however, if the manager were interested in a more complex partitioning of business information, he would be at a loss. It would be advantageous to display business information grouped along multiple dimensions in a single report.

BRIEF DESCRIPTION OF THE DRAWINGS

Various embodiments of the invention are disclosed in the following detailed description and the accompanying drawings.

FIG. 3 is a diagram illustrating an embodiment of a report.

FIG. 6 is a diagram illustrating an embodiment of a report.

FIG. 7 is a diagram illustrating an embodiment of a report.

DETAILED DESCRIPTION

Figure 1:
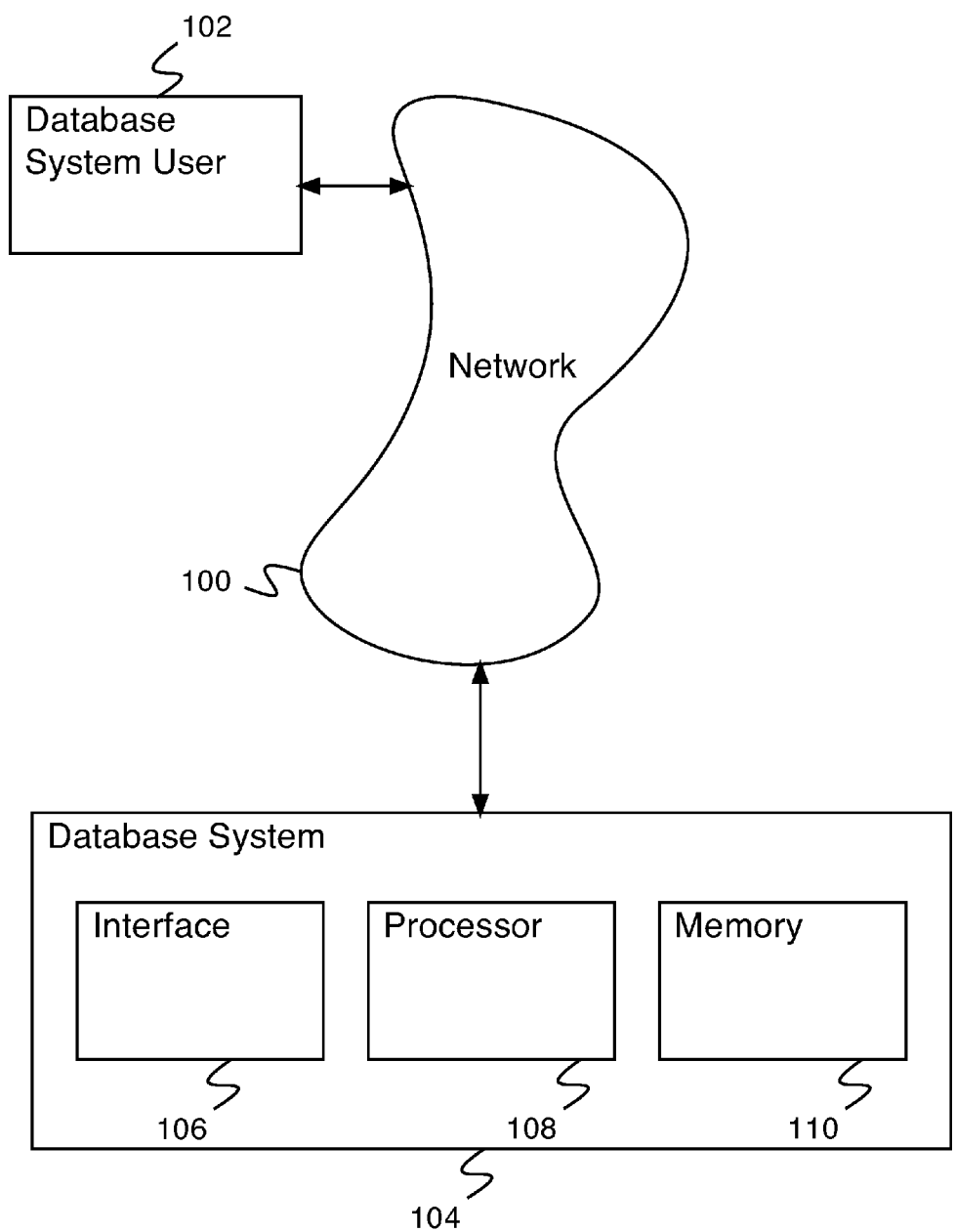
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A grid based user interface system is disclosed. A system for displaying data comprises an interface configured to receive an indication of a matrix element for expansion. The system for displaying data additionally comprises a processor configured to provide a matrix for display, wherein the matrix includes a plurality of matrix elements; and provide a modified matrix for display, wherein the matrix element selected for expansion is expanded maintaining relative position to all other matrix elements of the plurality of matrix elements, wherein all other matrix elements of the plurality of matrix elements are modified. The system for displaying data additionally comprises a memory coupled to the processor and configured to provide the processor with instructions.

A set of business data objects (e.g., employees, vendors, clients, tasks, accounts, etc.) is divided into a set of groups. Each group of objects is associated with a location in a 1 or 2-dimensional matrix, or is the unassociated group of objects. Each axis of the 1 or 2-dimensional matrix represents a value or a value range for an object attribute (e.g., employee potential, employee performance, employee salary, vendor value, client amount billed, etc.). The matrix is comprised of a set of matrix elements, each matrix element displayed at a specific location in the matrix and associated with a value for each axis of the matrix. The number of matrix elements is equal to the product of the number of possible values on each axis. The group of objects associated with a given matrix element comprises the set of objects whose attribute values are those matching the values associated with the matrix element on each axis. In various embodiments, the unassociated group of objects is shown in a separate region from the matrix, or is accessible via an indication to a menu or other user interface object.

A user of the matrix may wish to interact with it in several different ways. When the matrix is first displayed, the matrix is shown filled with business data objects at locations determined by their associated attribute values. A user can quickly learn about the business data objects by viewing the matrix display. For example, a matrix displays employee potential on one axis and employee performance on another. In various embodiments, matrices and axes comprise a matrix for employee performance on one axis and project/initiative importance on another axis; a matrix for employee performance on one axis and compensation quartile on another axis; a matrix for employee performance on one axis and retention on another axis; or any other appropriate matrices and axes. If the user desires to see a given matrix element more clearly, he makes an indication to that matrix element, causing the matrix element to be expanded maintaining relative position to the other matrix elements, while all other matrix elements of the plurality of matrix elements are modified in order to make room. If the user desires to move an object from one matrix element to another matrix element or from the unassociated group to the matrix element, he moves the object via drag and drop. In some embodiments, multiple objects are moved at once (e.g., multi-select employees in one matrix elements, then drag and drop them all to a new matrix element).

In various embodiments, an attribute of an object is associated with a matrix row or a matrix column or a matrix element.

FIG. 1 is a block diagram illustrating an embodiment of a network system. In the example shown, the network system comprises database system user 102 and database system 104, communicating via network 100. In various embodiments, network 100 comprises one or more of the following: a local area network, a wide area network, a wired network, a wireless network, the Internet, or any other appropriate network. Database system 104 comprises a database system for storage and retrieval of information. In some embodiments, database system 104 comprises a system for analysis of information. In some embodiments, database system 104 comprises a distributed database, e.g., a database system comprising multiple computers not necessarily in the same location. In some embodiments, database system 104 comprises a system for executing business processes. In some embodiments, database system 104 comprises a system for creating reports. In some embodiments, database system 104 comprises a system for a grid-based user interface system.

Database system 104 comprises interface 106, processor 108, and memory 110. In some embodiments, interface 106 comprises an interface configured to receive an indication of a matrix element for expansion. In some embodiments, processor 108 comprises a processor configured to provide a matrix for display, wherein the matrix includes a plurality of matrix elements; and provide a modified matrix for display, wherein the matrix element selected for expansion is expanded maintaining relative position to all other matrix elements of the plurality of matrix elements, wherein all other matrix elements of the plurality of matrix elements are modified. In some embodiments, memory 110 comprises a memory coupled to processor 108 and configured to provide processor 108 with instructions.

Database system user 102 comprises a database system user using database system 104. In some embodiments, database system user 102 comprises an employee at a company purchasing database system services. Database system user 102 comprises a database user accessing database services on database system 102. In some embodiments, database system user 102 comprises a user who uses a user interface (e.g., a keyboard, a touch screen, a display, etc.) to interact with database system 104. In various embodiments, the user interface is associated with a desktop computer, a laptop computer, a local terminal, smart phone, tablet, or any other appropriate system with a user interface. In some embodiments, database system user 102 comprises an employee at a company purchasing database system services. In various embodiments, there are 1, 2, 4, 13, 22, 115, or any other appropriate number of database system users accessing database services on database system 104. In some embodiments, each database system user only has access to their own data stored on database system 104 and is able to utilize database system 104 as though they are the sole database system user. In some embodiments, database system user 102 configures services on database system 104. In some embodiments, a database system user (e.g., database system user 102) comprises a person accessing database system 104 via a user interface, e.g., a web page. In some embodiments, a database system user comprises an automated system accessing database system 104 via a machine interface, e.g., a public application programming interface (API).

Figure 2:
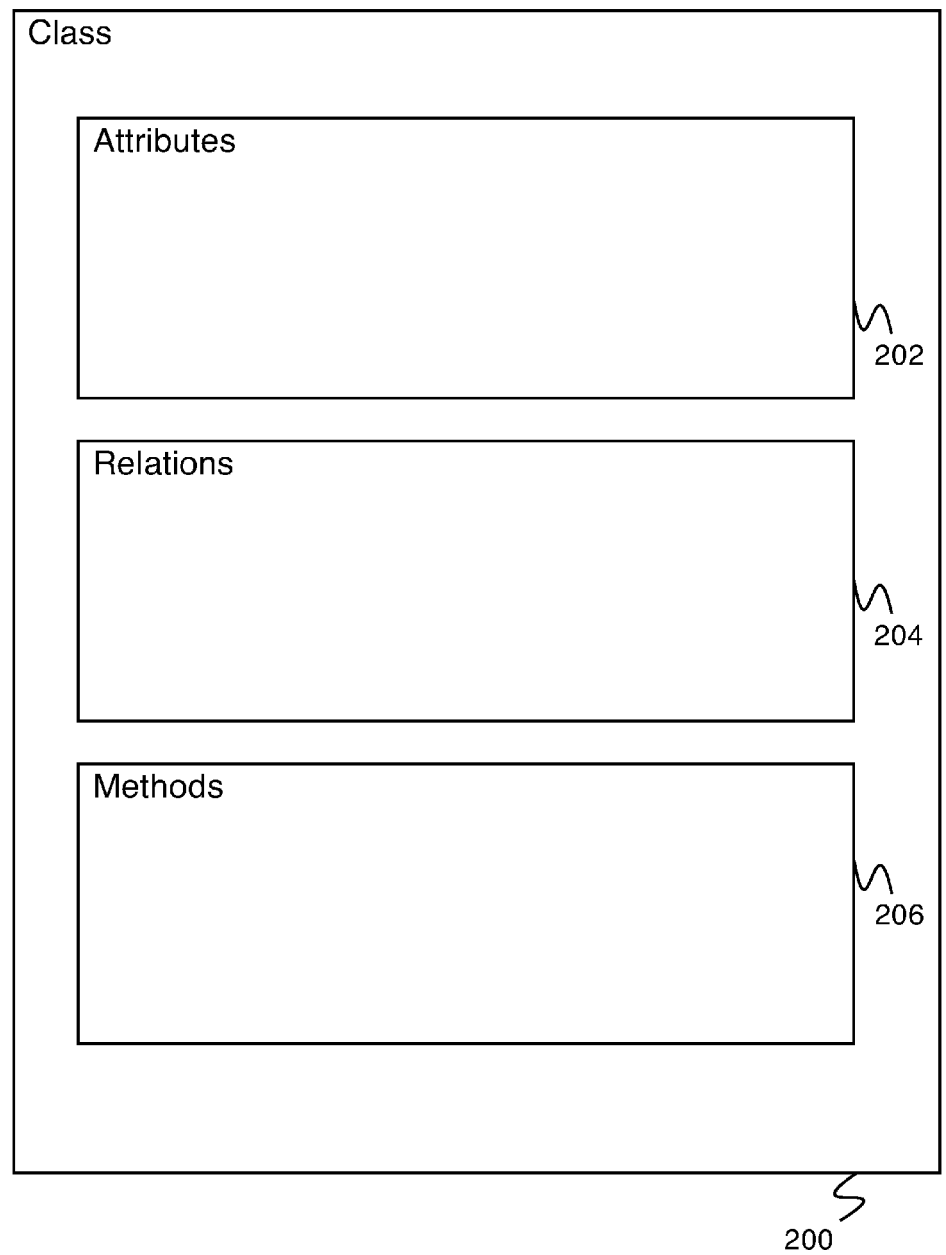
FIG. 2 is a block diagram illustrating an embodiment of a class data structure.

FIG. 2 is a block diagram illustrating an embodiment of a class data structure. In some embodiments, stored data (e.g., data stored in external storage 110 of FIG. 1) is stored in class data structures of FIG. 2. In the example shown, class 200 is comprised of zero, one, or more than one attributes 202, zero, one, or more than one relations 204, and zero, one, or more than one methods 206. Attributes 202 store data about the class, for instance, name, location, salary, title, cost, vendor, or any other human resource, corporate, financial, legal, or medical data, or any other appropriate data. Relations 204 store relations between a given object instance of class 200 and other object instances of the class or of other class definitions. Methods 206 define operations that can be performed with the attributes and relations. A given class definition has a certain set of attributes and relations, as well as a certain set of methods used to operate on those attributes and relations. A given object instance of a class definition comprises a set of stored values for the attributes and relations. In some embodiments, object classes can inherit from one another. When a child object class inherits from a parent object class, it takes on the class definition of the parent object. The class definition of the child object can then be extended by adding or overwriting methods, attributes, or relations. In some embodiments, object classes are defined as part of software sold by a system vendor and used by a system user (e.g., database system user 102 of FIG. 1). In some embodiments, a system user can create new classes as desired in order to customize and/or extend the software sold by the system vendor.

FIG. 3 is a diagram illustrating an embodiment of a report. In the example shown, report 300 comprises a chart. Report 300 comprises a chart listing a set of employees and associated information (e.g., information regarding employee potential, information regarding employee performance, etc.). In some embodiments, employees comprise object instances of an employee class. In some embodiments, employee information comprises attribute values of the object instances. In various embodiments, objects in some examples of matrix reports have attributes associated with them—for example, Retention (e.g., Flight Risk) with values of High, Medium, Low; Compensation Quartile (e.g., Q1, Q2, Q3, Q4); Initiative Importance (e.g., High, Medium, Low); Gender (e.g., Male, Female); Experience (e.g., Early Career, Mid Career, Late Career); Age Range (e.g., Under 25; 25-29; 30-39; 40-49; 50-59; 60+), or any other appropriate attribute. Employees are shown sorted in alphabetical order by first name. Relationships between employees (e.g., which employees have the same potential or performance, which employees have higher or lower potential or performance than others, etc.) are not immediately readable from this chart. In various embodiments, a relationship associated with an object in an example of a matrix report comprises: a relationship between employees that are highly compensated but not performing well, a relationship between employees that are performing very well but not well compensated, a relationship between employees that are at risk of leaving and working on our most important initiatives, a relationship between highest performing employees and those working on our most critical initiatives, a relationship between employee compensation when considering gender, a relationship between compensation when considering age, or any other appropriate relationship between objects. In various embodiments, a method associated with an object in an example matrix report comprises promoting an employee, giving an employee a pay increase, assigning an employee to a different initiative, or any other appropriate method.

Figure 4:
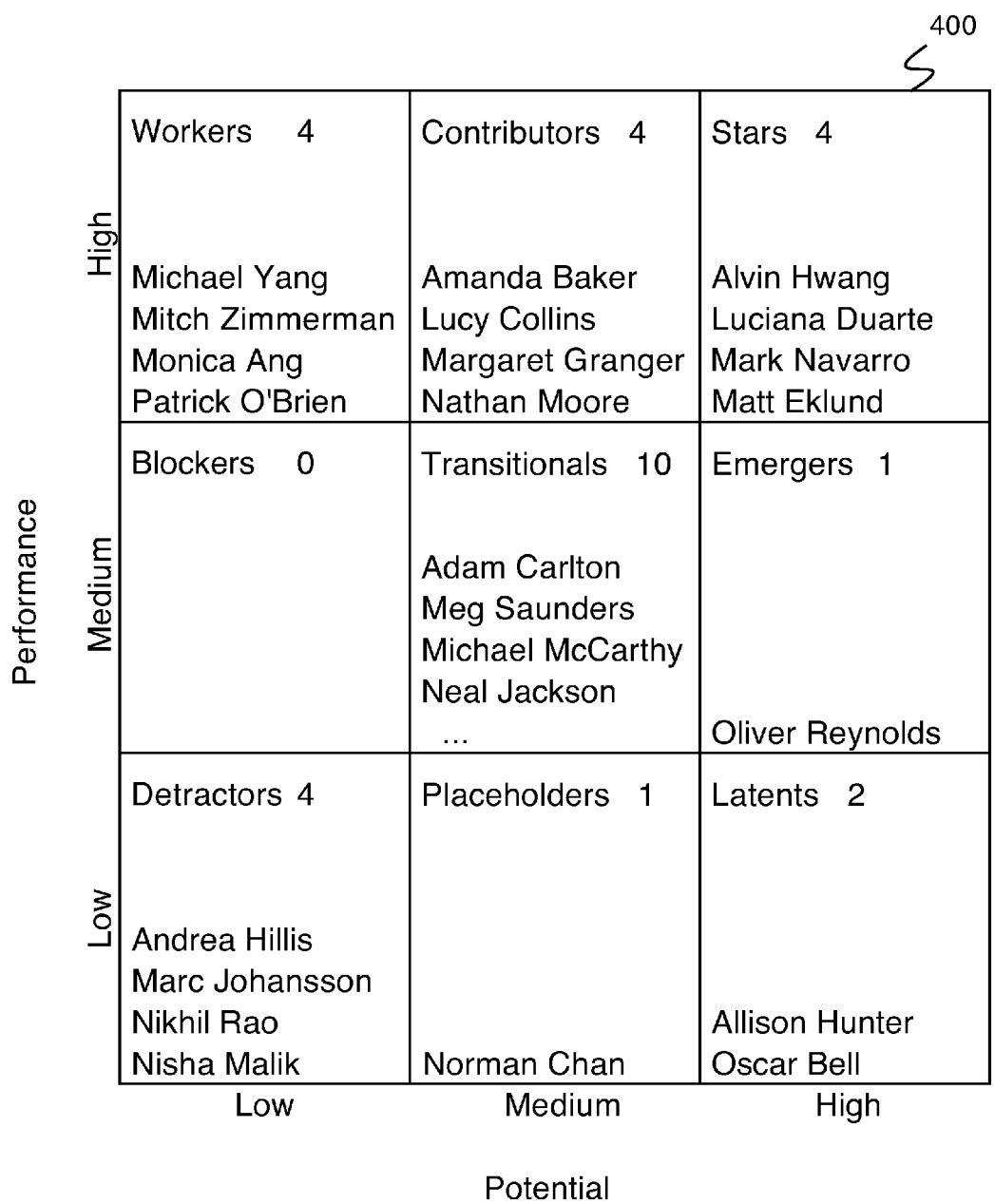
FIG. 4 is a diagram illustrating an embodiment of a report.

FIG. 4 is a diagram illustrating an embodiment of a report. In the example shown, report 400 comprises a chart. Report 400 comprises a chart showing a set of employees and associated information (e.g., information regarding employee potential, information regarding employee performance). Employees are shown in a matrix with employee potential on the X-axis and employee performance on the Y-axis. Each matrix element displays an associated matrix element title (e.g., "Workers", "Transitionals", etc.), a value of the number of employee objects associated with the matrix element, and the set of employee names corresponding to employee objects associated with the matrix element. In some embodiments, if there is not room to display all employee names corresponding to employee objects associated with the matrix element, an ellipsis is shown to indicate some names are hidden. The set of employee objects associated with a matrix element comprises the set of employee objects for which the associated attributes correspond to the labels shown on both the X-axis and the Y-axis. In some embodiments, report 400 comprises a grid-based user interface system. In various embodiments, a grid-based user interface system has one row, three rows, six rows, one column, two columns, five columns, six columns, or any other appropriate number of rows and columns. In the example shown, report 400 comprises three rows and three columns.

In some embodiments, a matrix element size is determined using a total area designated for the matrix. In some embodiments, the matrix elements are of equal size. In some embodiments, the matrix elements are equal sized in the vertical dimension. In some embodiments, the matrix elements are equal sized in the horizontal dimension. In some embodiments, the font size and spacing around the font (e.g., margins within the matrix element, interline spacing) is automatically selected based on the matrix element size.

Figure 5:
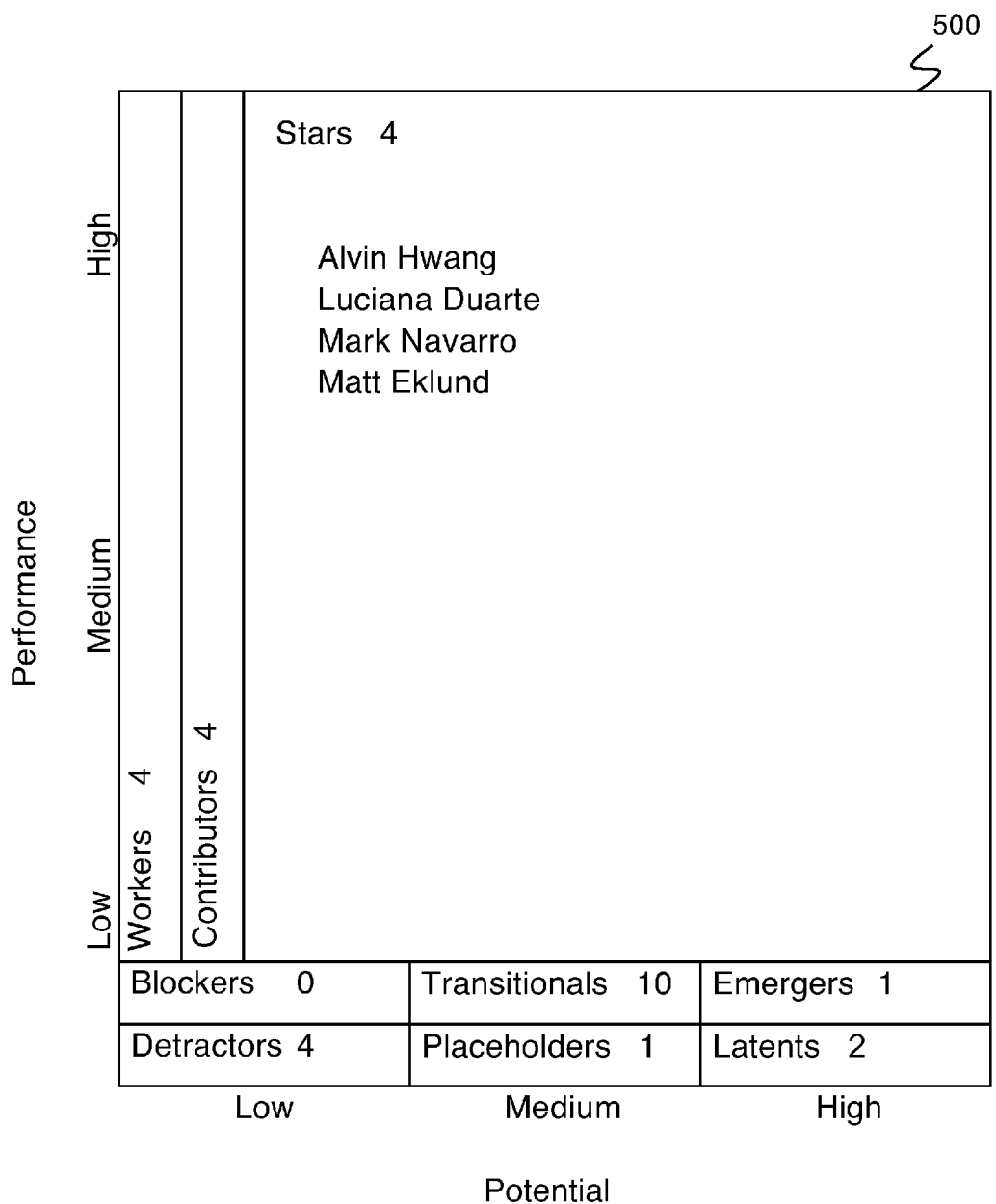
FIG. 5 is a diagram illustrating an embodiment of a report with an expanded matrix object.

FIG. 5 is a diagram illustrating an embodiment of a report with an expanded matrix object. In the example shown, report 500 comprises a chart. Report 500 comprises a chart showing a set of employees and associated information (e.g., information regarding employee potential, information regarding employee performance, etc.). Report 500 comprises a modified version of report 400 of FIG. 4 with a single matrix element (e.g., the element labeled "Stars") selected for expansion. Report 500 comprises a modified matrix with an expanded matrix element. In some embodiments, when an indication is made to a matrix element, the report expands that matrix element. In the example shown, matrix elements not in the same row with the matrix element selected for expansion are displayed with a compressed vertical dimension. Matrix elements not in the same row with the matrix element selected for expansion are displayed with an unmodified horizontal dimension. Matrix elements in the same row with the matrix element selected for expansion are displayed with an expanded vertical dimension. Matrix elements in the same row with the matrix element selected for expansion are displayed with a compressed horizontal dimension. The matrix element selected for expansion is displayed with an expanded horizontal dimension and an expanded vertical dimension. Displaying the matrix element selected for expansion with an expanded horizontal dimension and an expanded vertical dimension allows a greater number of objects to be displayed for that element than in the matrix with no elements selected for expansion. In some embodiments, an animation smoothes the transition while matrix elements are resized. In some embodiments, additional information is displayed for each object in the element selected for expansion (e.g., an employee photo, other relevant employee data, etc.) In some embodiments, scrolling or paging is supported in the expanded matrix element to show an arbitrarily large number of objects. In some embodiments, there is a setup screen for the person creating a report where the person defines what attributes about an employee are to be shown in the normal state and what attributes are to be shown in the expanded state. Each element of the modified matrix retains its label. Some elements of the modified matrix display the label rotated by ninety degrees. Each element of the modified matrix retains the indication of the number of associated elements.

In some embodiments, in the event that one matrix element is expanded and an indication is given to a different matrix element to expand, the first matrix element is caused to automatically compress itself and the different matrix element is caused to expand.

In some embodiments, a modified matrix element size is determined based on font and font spacing size. In some embodiments, a modified matrix element size determines font and font spacing size.

FIG. 6 is a diagram illustrating an embodiment of a report. In the example shown, report 600 comprises a chart. Report 600 comprises a chart showing a set of employees and associated information (e.g., a chart listing a set of employees and associated information as in chart 400 of FIG. 4). In some embodiments, report 600 comprises a matrix. In some embodiments, if an indication is made to a matrix element, the chart is displayed with the matrix element expanded. Report 600 additionally comprises a set of data objects for which there is no data for one or both of the data attributes shown on the X-axis and the Y-axis (e.g., the section labeled "Unplotted"). In some embodiments, an object ends up in the "unplotted" area in the event that the current signed-in user does not have appropriate security to see one or both of the X and Y axis data attributes for the object. For example, the object may have the data but the current user can't see it. In some embodiments, an object can be moved from the "Unplotted" section to a matrix element, or from one matrix element to another, or from one matrix element back to the "unplotted" area, by making an appropriate indication. In some embodiments, an appropriate indication comprises a drag and drop. Report 600 additionally comprises a set of filter checkboxes (e.g., shown in the upper left of the diagram). Each of the filter checkboxes causes the set of data objects to be filtered by only showing those with an attribute value matching the checkbox label. Report 600 additionally shows an indication of the total number of data objects included in the matrix and the "Unplotted" section. In some embodiments, an object not associated with any matrix element comprises elements not plotted in the matrix.

In some embodiments, the matrix size is determined based on frame(s) also displayed. In some embodiments, a frame displays a filter window. In some embodiments, a frame displays a list of objects for placement within the matrix.

In some embodiments, when placed, the object is automatically associated with the attributes of the column and/or the row.

Also, there are two distinct ways of thinking of what happens when an object is moved between matrix elements or an unplotted area. In some embodiments, the underlying object automatically updates its relationships/attributes corresponding to the X and Y axis values of the matrix element. In some embodiments, the underlying object has a relationship to the matrix element itself—In other words, that a worker is a contributor or a star is persisted, not just what their performance and potential ratings are after a drag and drop.

FIG. 7 is a diagram illustrating an embodiment of a report. In the example shown, report 700 comprises a chart showing a set of employees and associated information. In some embodiments report 700 comprises a matrix. In the example shown, report 700 comprises a matrix with one row and five columns. Each matrix element displays a matrix element label, an indication of the number of associated objects, and a name corresponding to each object. In some embodiments, if there is not room in the matrix element to display the name corresponding to each object, an ellipsis is displayed to indicate that some names are hidden.

Figure 8:
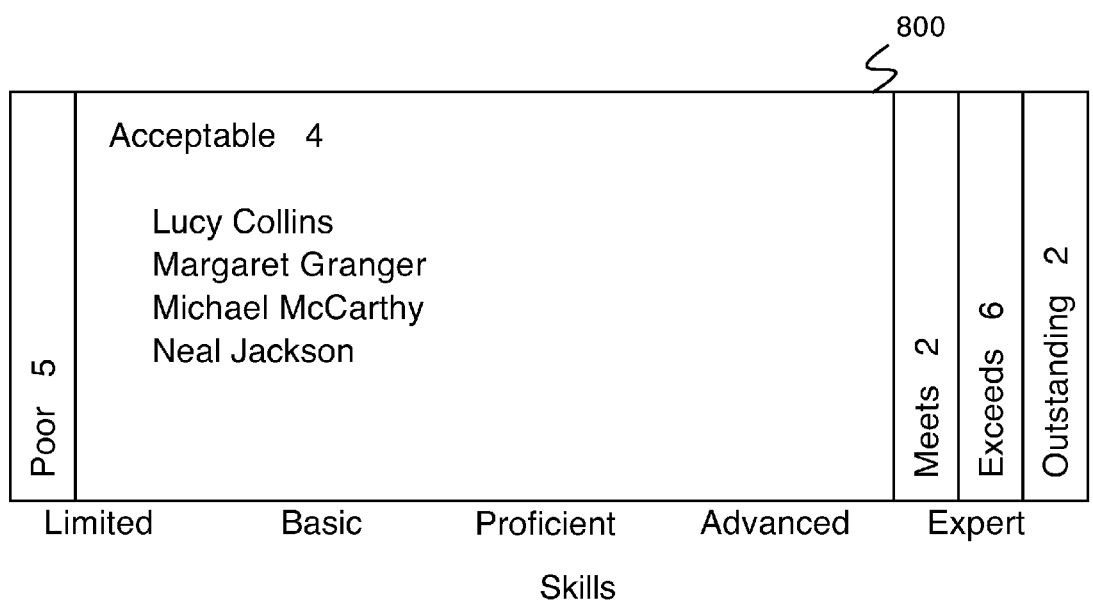
FIG. 8 is a diagram illustrating an embodiment of a report with an expanded matrix object.

FIG. 8 is a diagram illustrating an embodiment of a report with an expanded matrix object. In some embodiments, report 800 comprises report 700 of FIG. 7 with an expanded matrix object. In the example shown, the expanded matrix object is shown expanded, with all other matrix objects shown modified.

Figure 9:
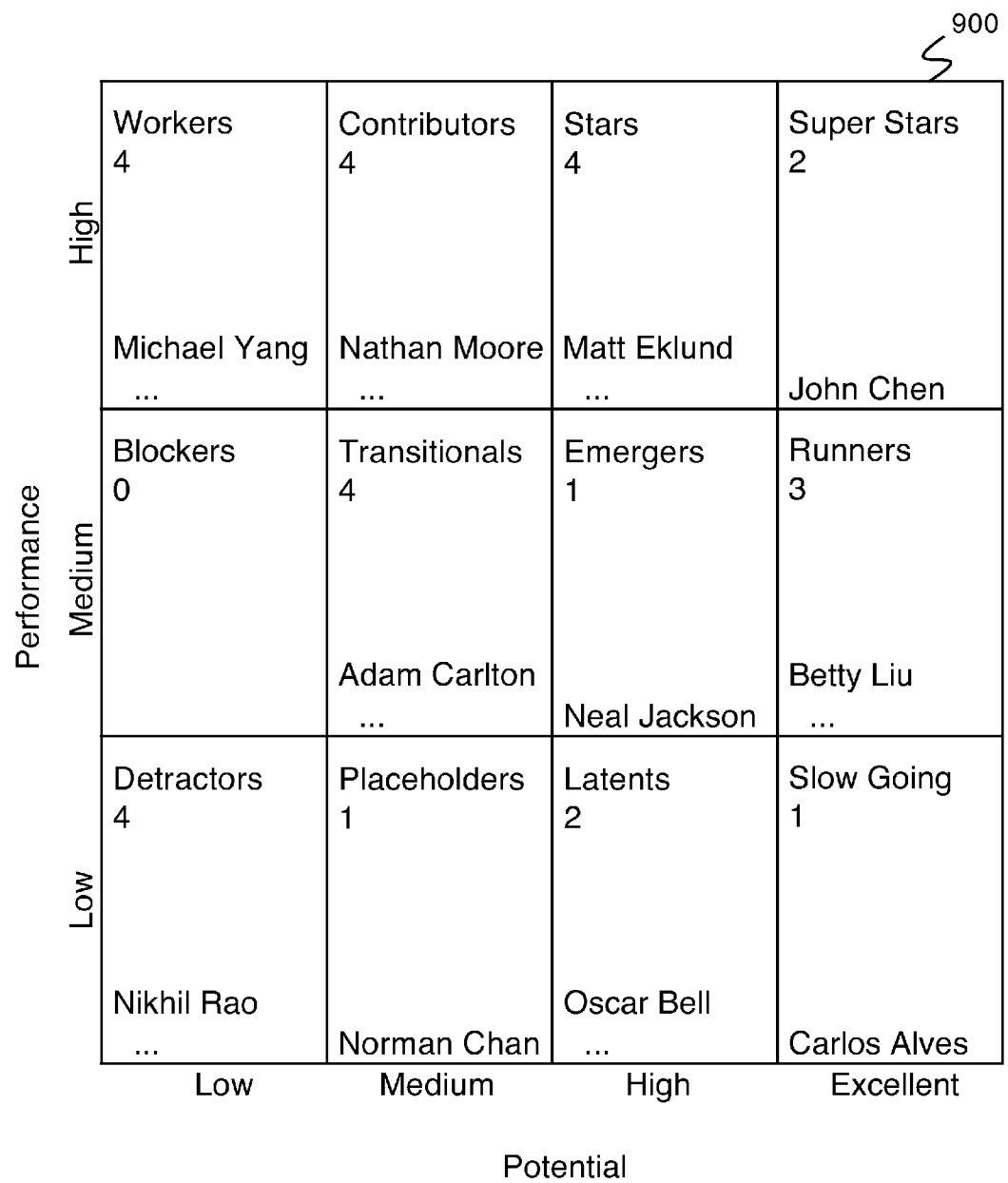
FIG. 9 is a diagram illustrating an embodiment of a report.

FIG. 9 is a diagram illustrating an embodiment of a report. In the example shown, report 900 comprises a chart showing a set of employees and associated information. In some embodiments report 900 comprises a matrix. In the example shown, report 900 comprises a matrix with three rows and four columns. Each matrix element displays a matrix element label, an indication of the number of associated objects, and a name corresponding to each object. In some embodiments, if there is not room in the matrix element to display the name corresponding to each object, an ellipsis is displayed to indicate that some names are hidden.

Figure 10:
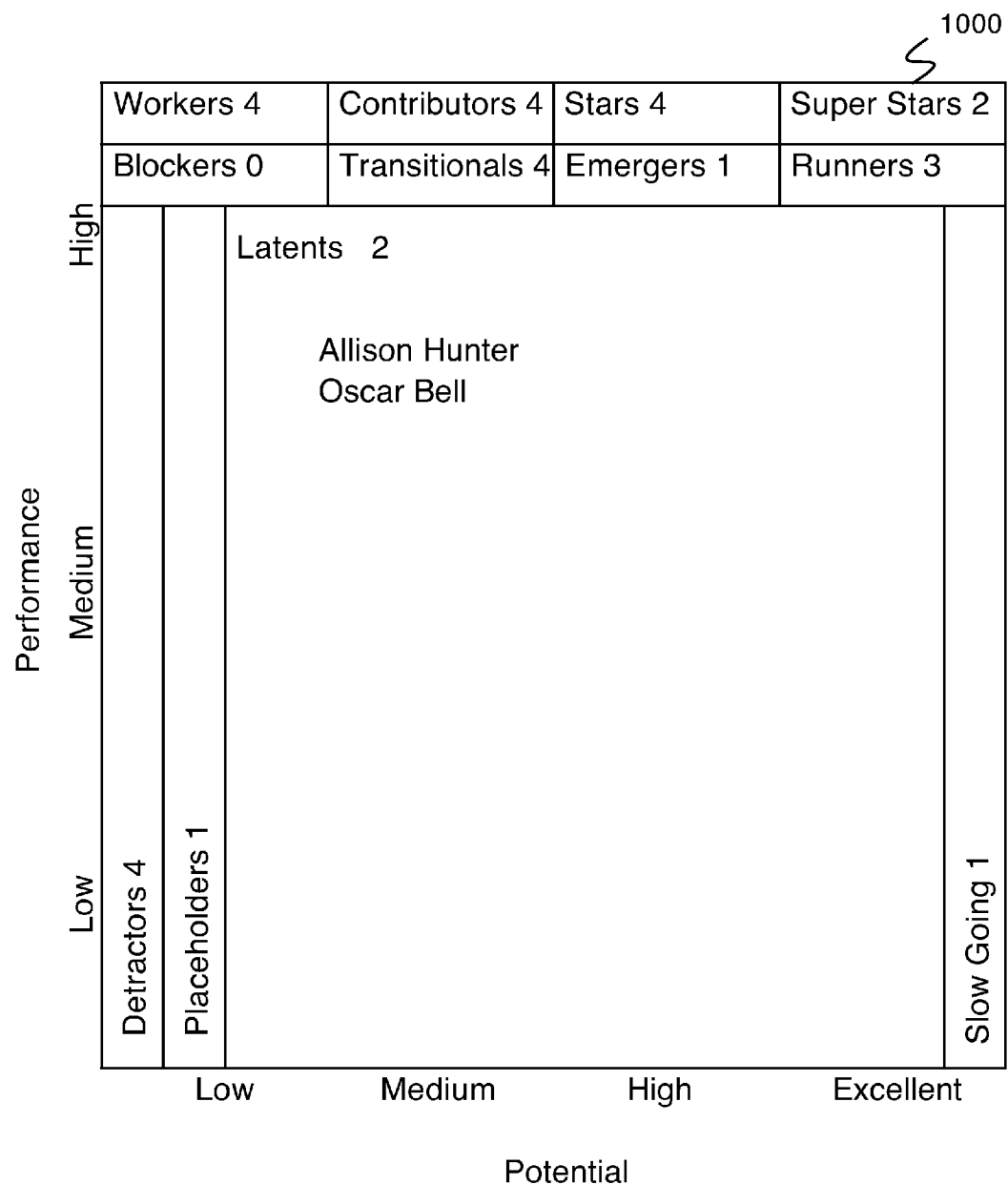
FIG. 10 is a diagram illustrating an embodiment of a report with an expanded matrix object.

FIG. 10 is a diagram illustrating an embodiment of a report with an expanded matrix object. In some embodiments, report 1000 comprises report 900 of FIG. 9 with an expanded matrix object. In the example shown, the expanded matrix object is shown expanded, with all other matrix objects shown modified.

Figure 11:
FIG. 11 is a diagram illustrating an embodiment of a report.

FIG. 11 is a diagram illustrating an embodiment of a report. In the example shown, report 1100 comprises a chart showing a set of employees and associated information. In some embodiments report 1100 comprises a matrix. In the example shown, report 1100 comprises a matrix with five rows and three columns. Each matrix element displays a matrix element label, an indication of the number of associated objects, and a name corresponding to each object. In some embodiments, if there is not room in the matrix element to display the name corresponding to each object, an ellipsis is displayed to indicate that some names are hidden.

Figure 12:
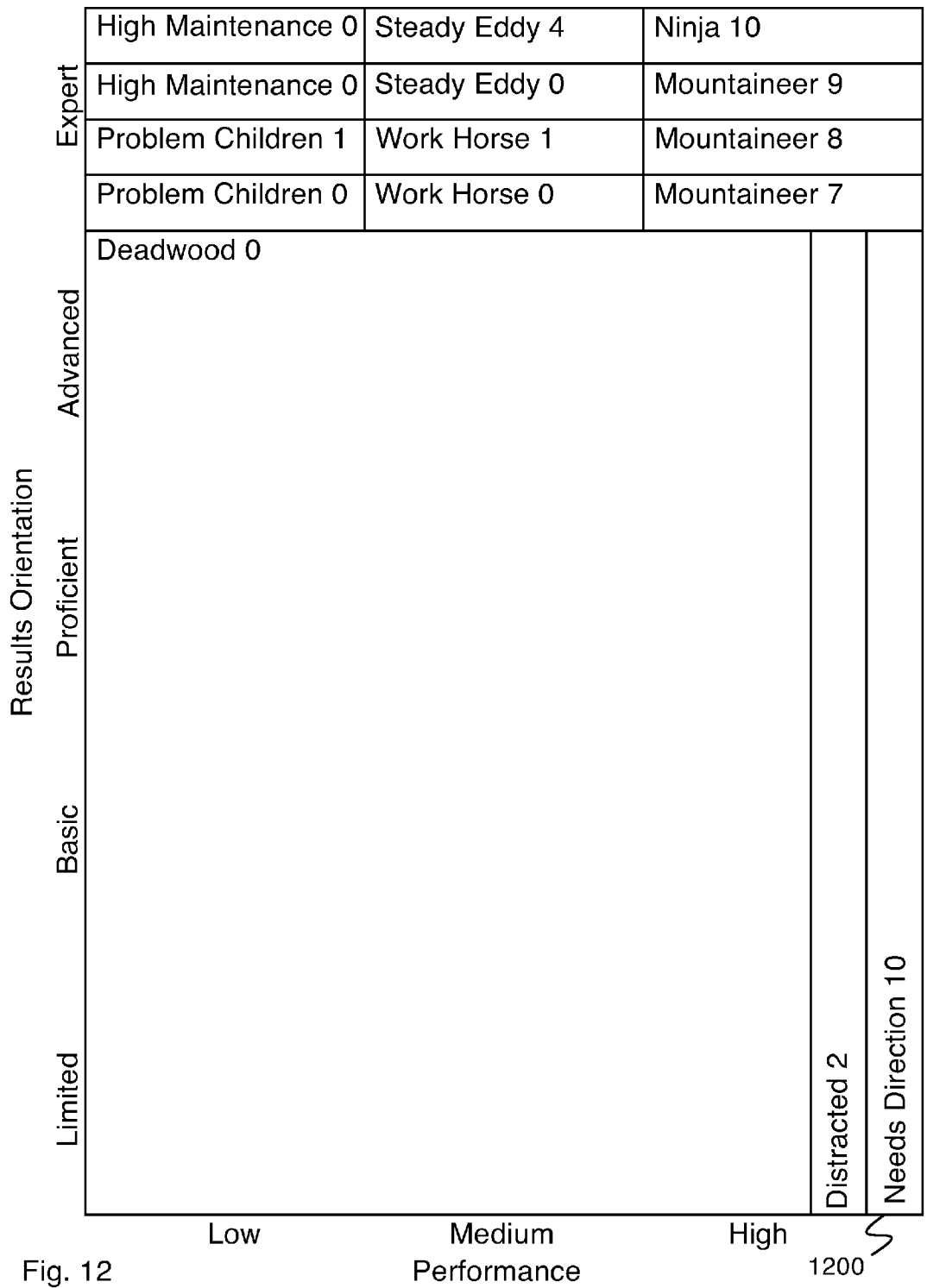
FIG. 12 is a diagram illustrating an embodiment of a report with an expanded matrix object.

FIG. 12 is a diagram illustrating an embodiment of a report with an expanded matrix object. In some embodiments, report 1200 comprises report 1100 of FIG. 11 with an expanded matrix object. In the example shown, the expanded matrix object is shown expanded, with all other matrix objects shown modified.

Figure 13:
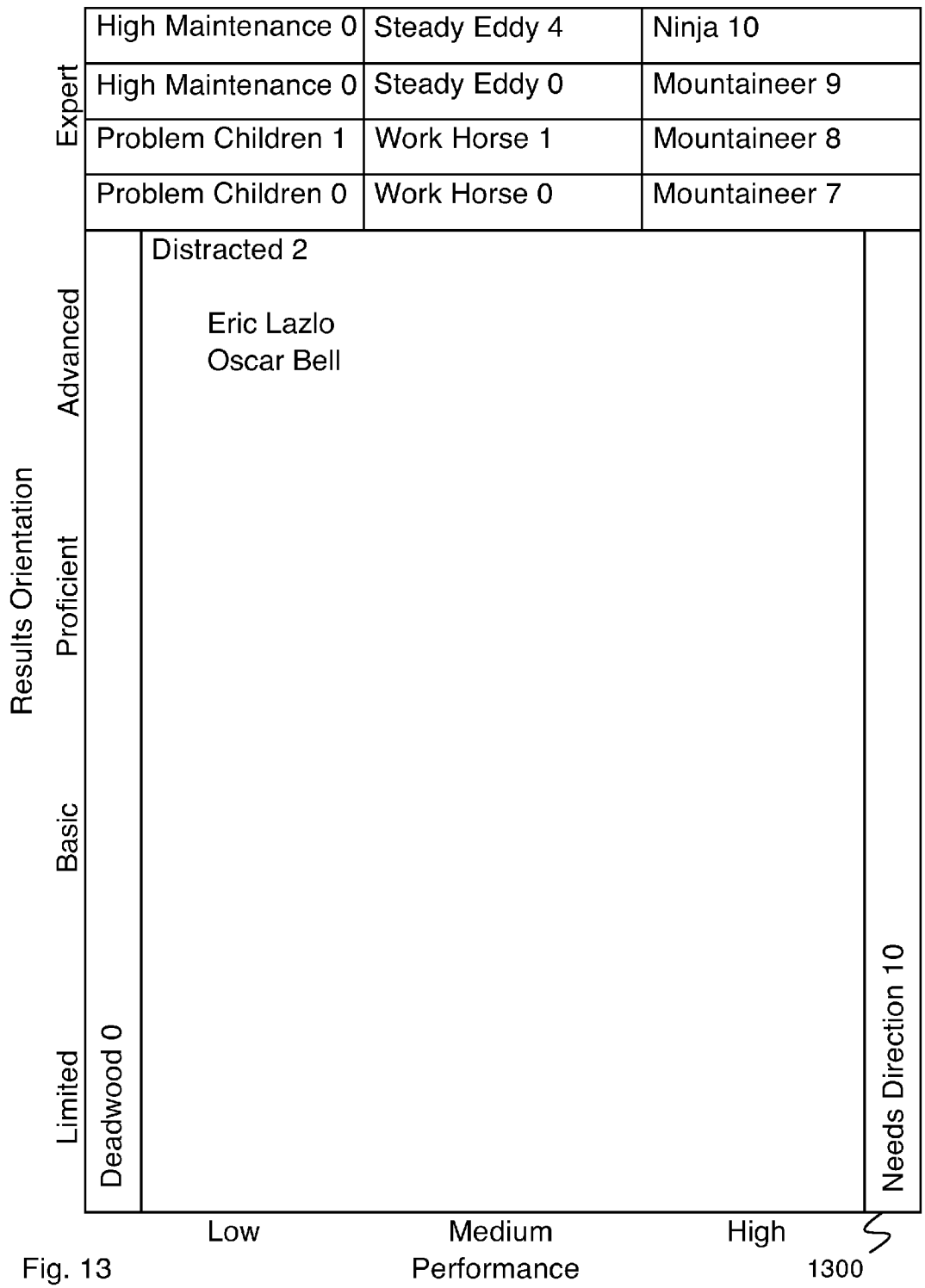
FIG. 13 is a diagram illustrating an embodiment of a report with an expanded matrix object.

FIG. 13 is a diagram illustrating an embodiment of a report with an expanded matrix object. In some embodiments, report 1300 comprises report 1100 of FIG. 11 with an expanded matrix object. In the example shown, the expanded matrix object is shown expanded, with all other matrix objects shown modified.

Figure 14:
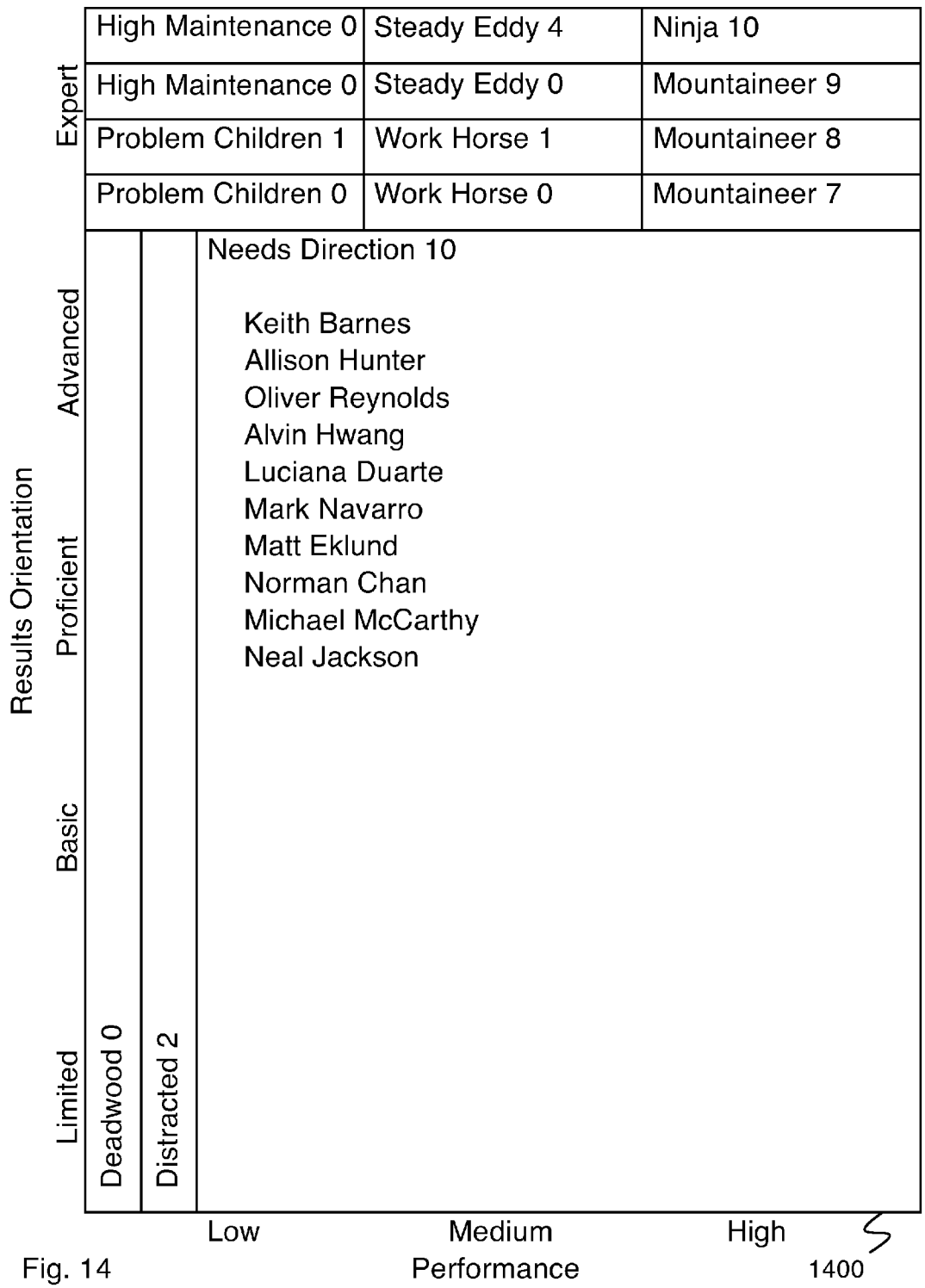
FIG. 14 is a diagram illustrating an embodiment of a report with an expanded matrix object.

FIG. 14 is a diagram illustrating an embodiment of a report with an expanded matrix object. In some embodiments, report 1400 comprises report 1100 of FIG. 11 with an expanded matrix object. In the example shown, the expanded matrix object is shown expanded, with all other matrix objects shown modified.

Figure 15:
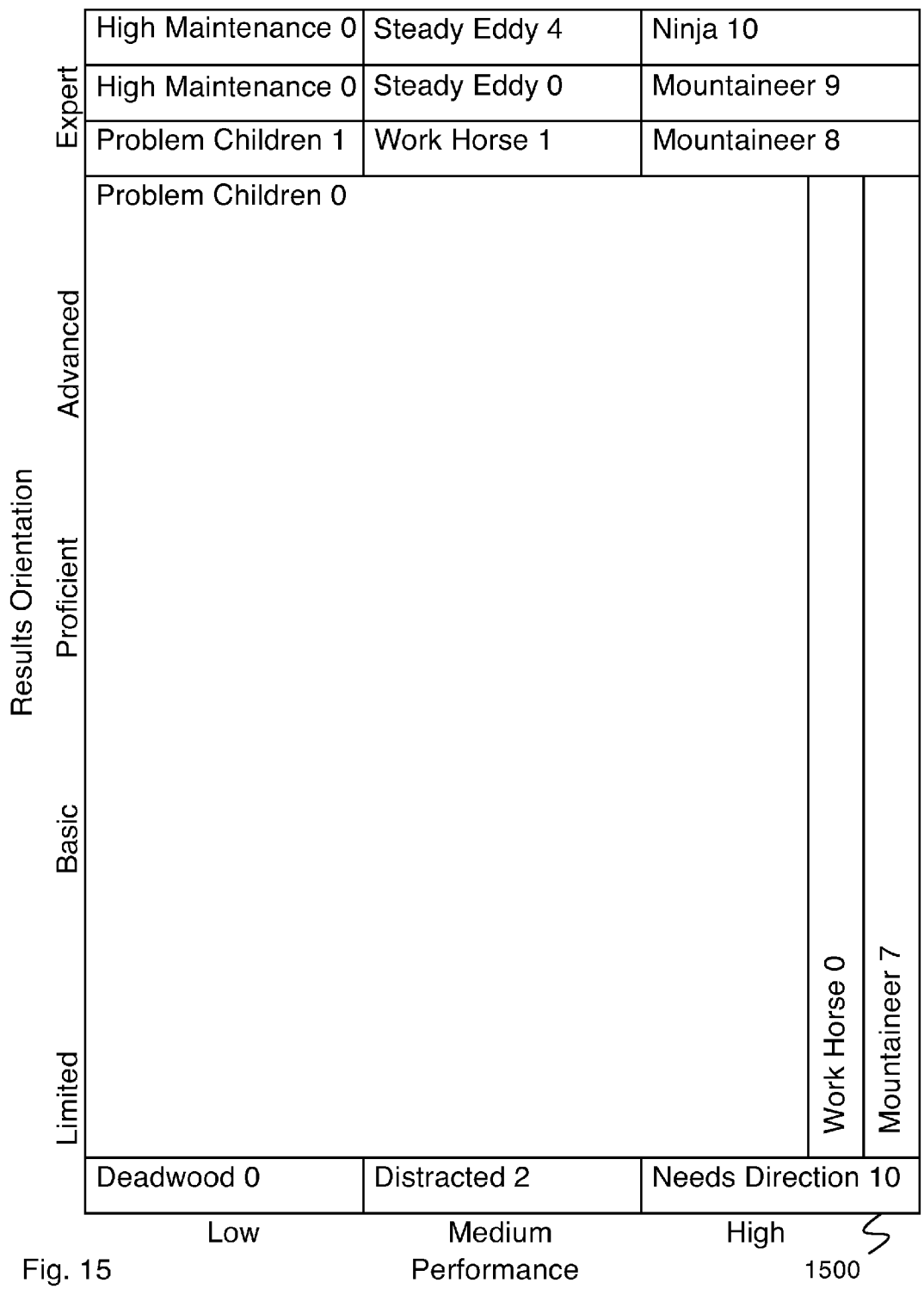
FIG. 15 is a diagram illustrating an embodiment of a report with an expanded matrix object.

FIG. 15 is a diagram illustrating an embodiment of a report with an expanded matrix object. In some embodiments, report 1500 comprises report 1100 of FIG. 11 with an expanded matrix object. In the example shown, the expanded matrix object is shown expanded, with all other matrix objects shown modified.

Figure 16:
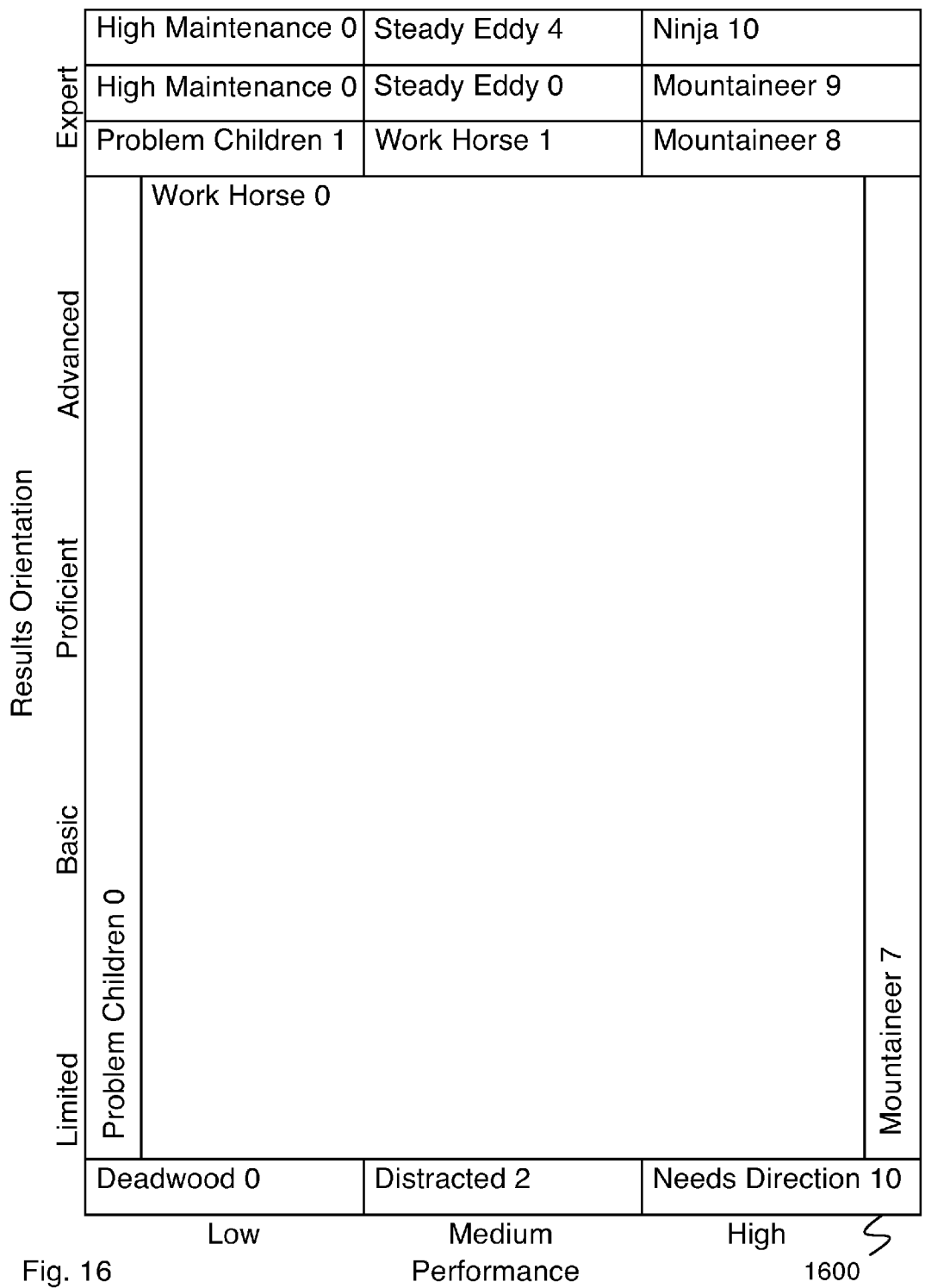
FIG. 16 is a diagram illustrating an embodiment of a report with an expanded matrix object.

FIG. 16 is a diagram illustrating an embodiment of a report with an expanded matrix object. In some embodiments, report 1600 comprises report 1100 of FIG. 11 with an expanded matrix object. In the example shown, the expanded matrix object is shown expanded, with all other matrix objects shown modified.

Figure 17:
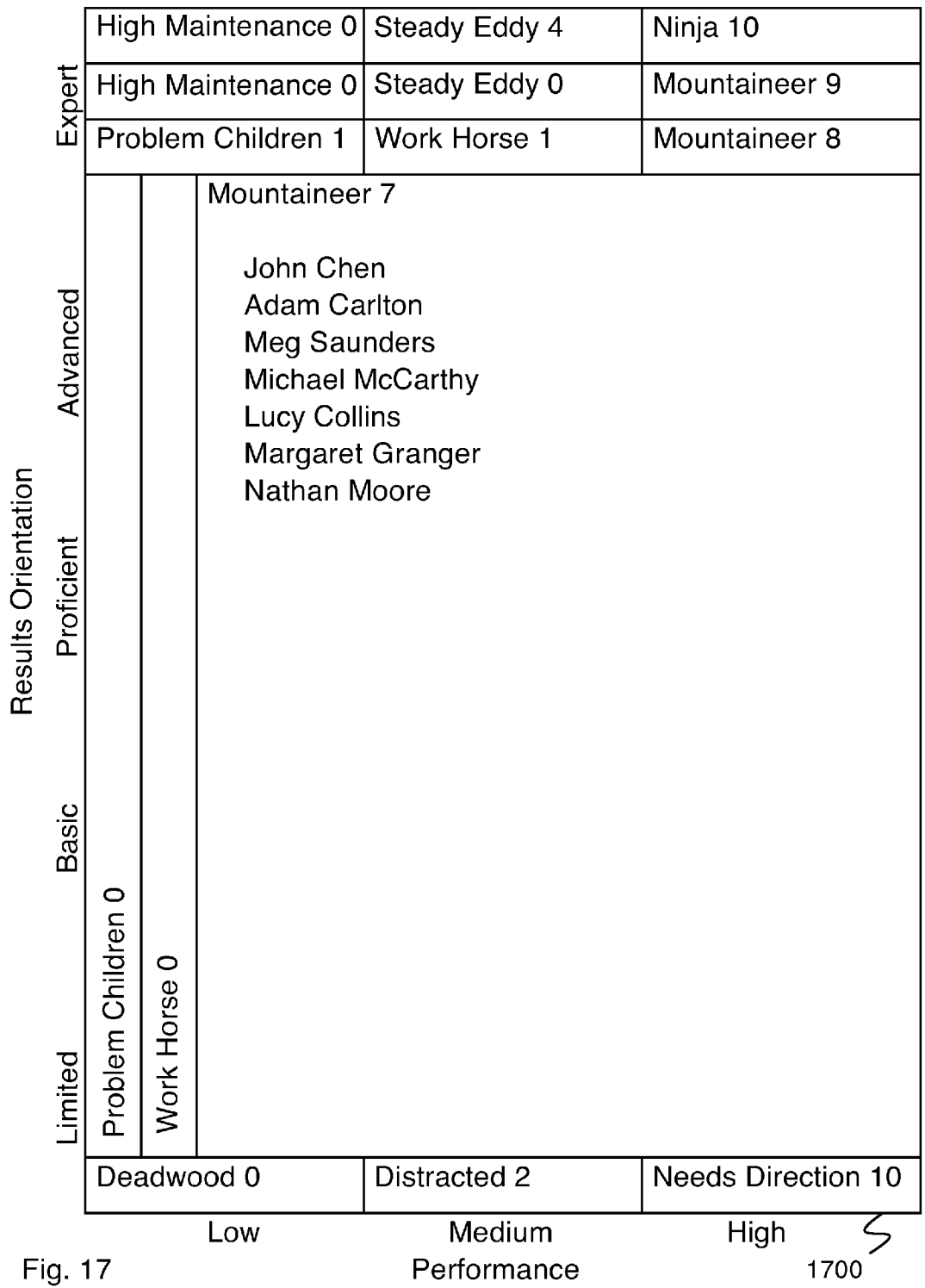
FIG. 17 is a diagram illustrating an embodiment of a report with an expanded matrix object.

FIG. 17 is a diagram illustrating an embodiment of a report with an expanded matrix object. In some embodiments, report 1700 comprises report 1100 of FIG. 11 with an expanded matrix object. In the example shown, the expanded matrix object is shown expanded, with all other matrix objects shown modified.

Figure 18:
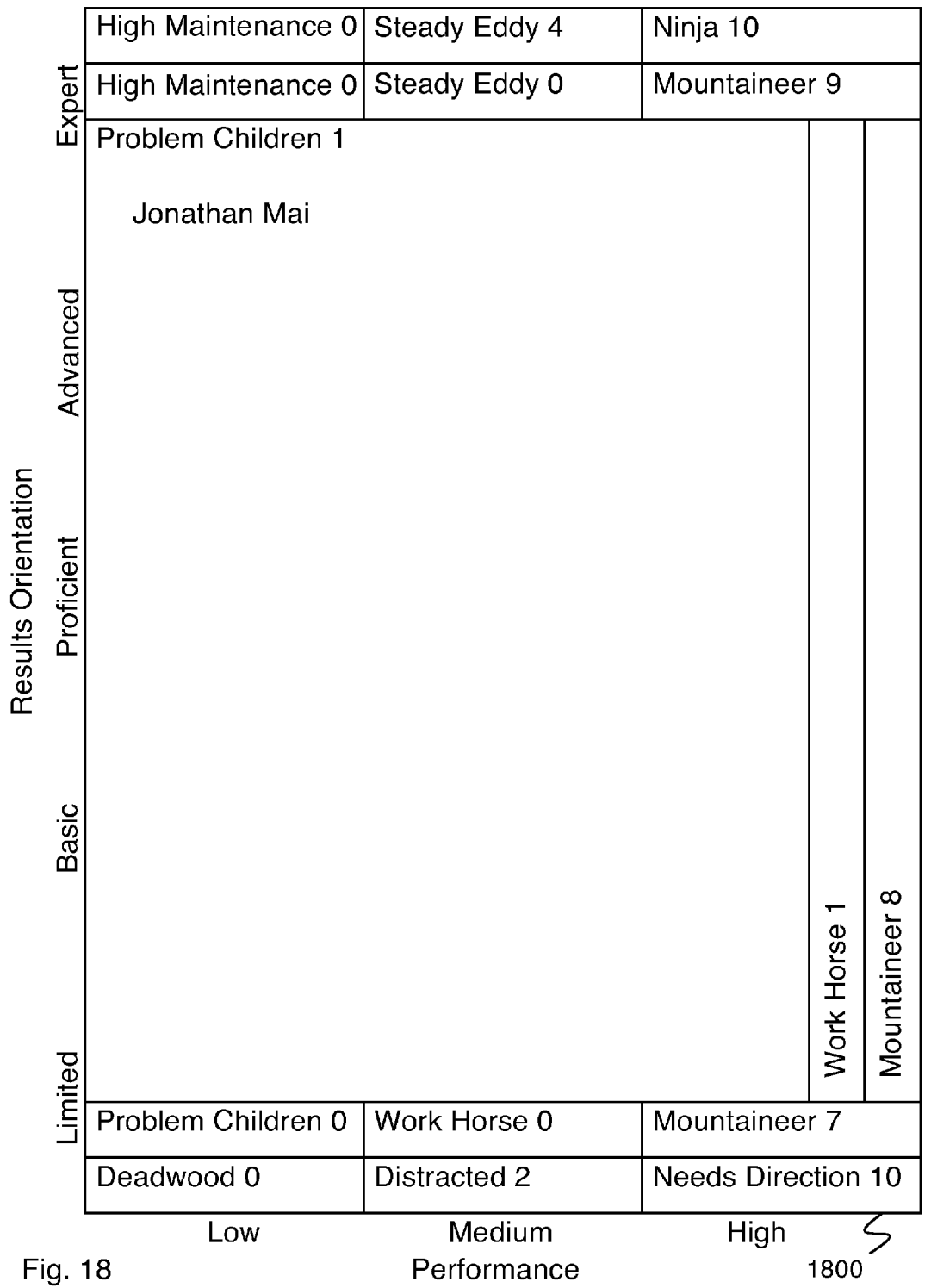
FIG. 18 is a diagram illustrating an embodiment of a report with an expanded matrix object.

FIG. 18 is a diagram illustrating an embodiment of a report with an expanded matrix object. In some embodiments, report 1800 comprises report 1100 of FIG. 11 with an expanded matrix object. In the example shown, the expanded matrix object is shown expanded, with all other matrix objects shown modified.

Figure 19:
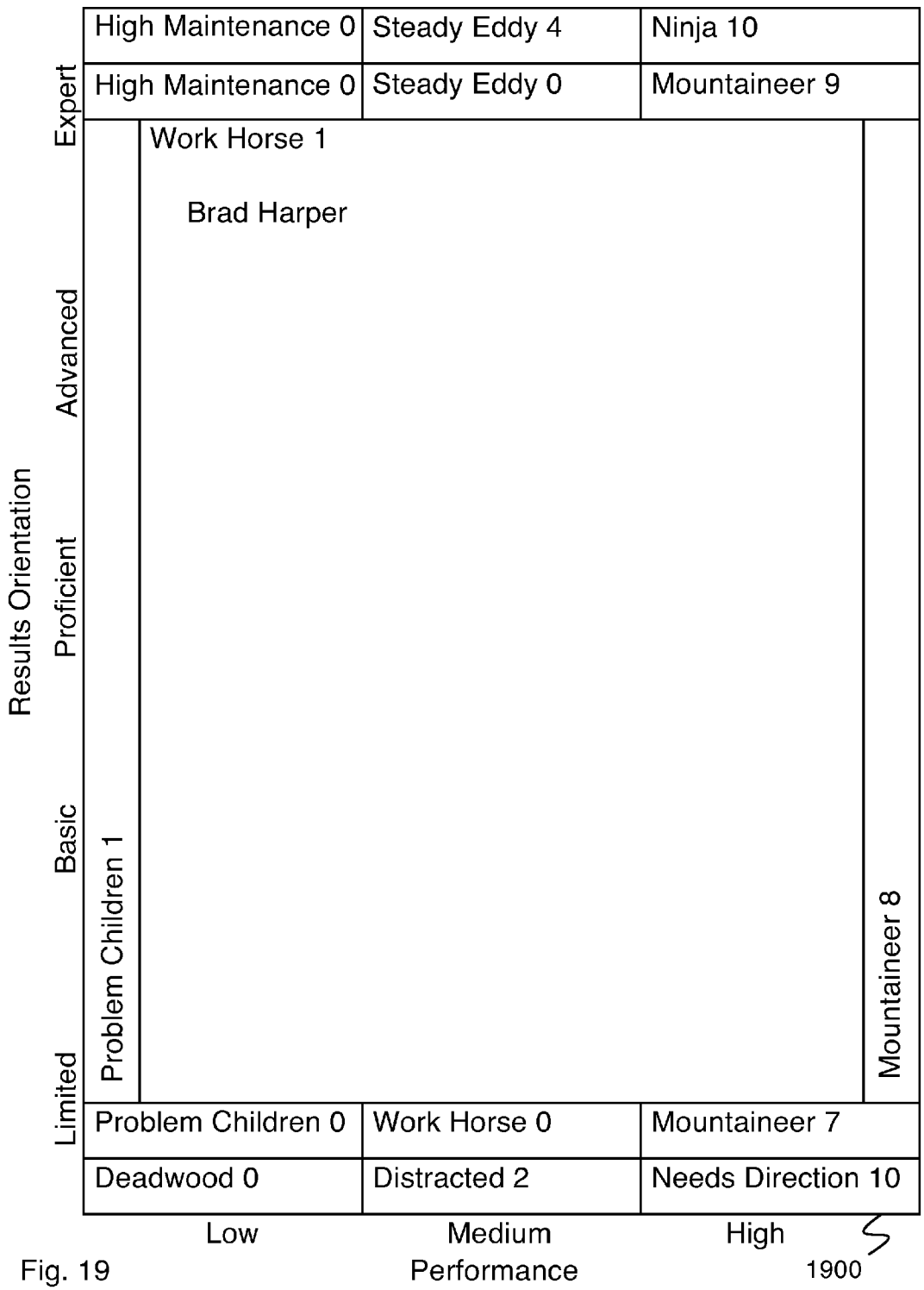
FIG. 19 is a diagram illustrating an embodiment of a report with an expanded matrix object.

FIG. 19 is a diagram illustrating an embodiment of a report with an expanded matrix object. In some embodiments, report 1900 comprises report 1100 of FIG. 11 with an expanded matrix object. In the example shown, the expanded matrix object is shown expanded, with all other matrix objects shown modified.

Figure 20:
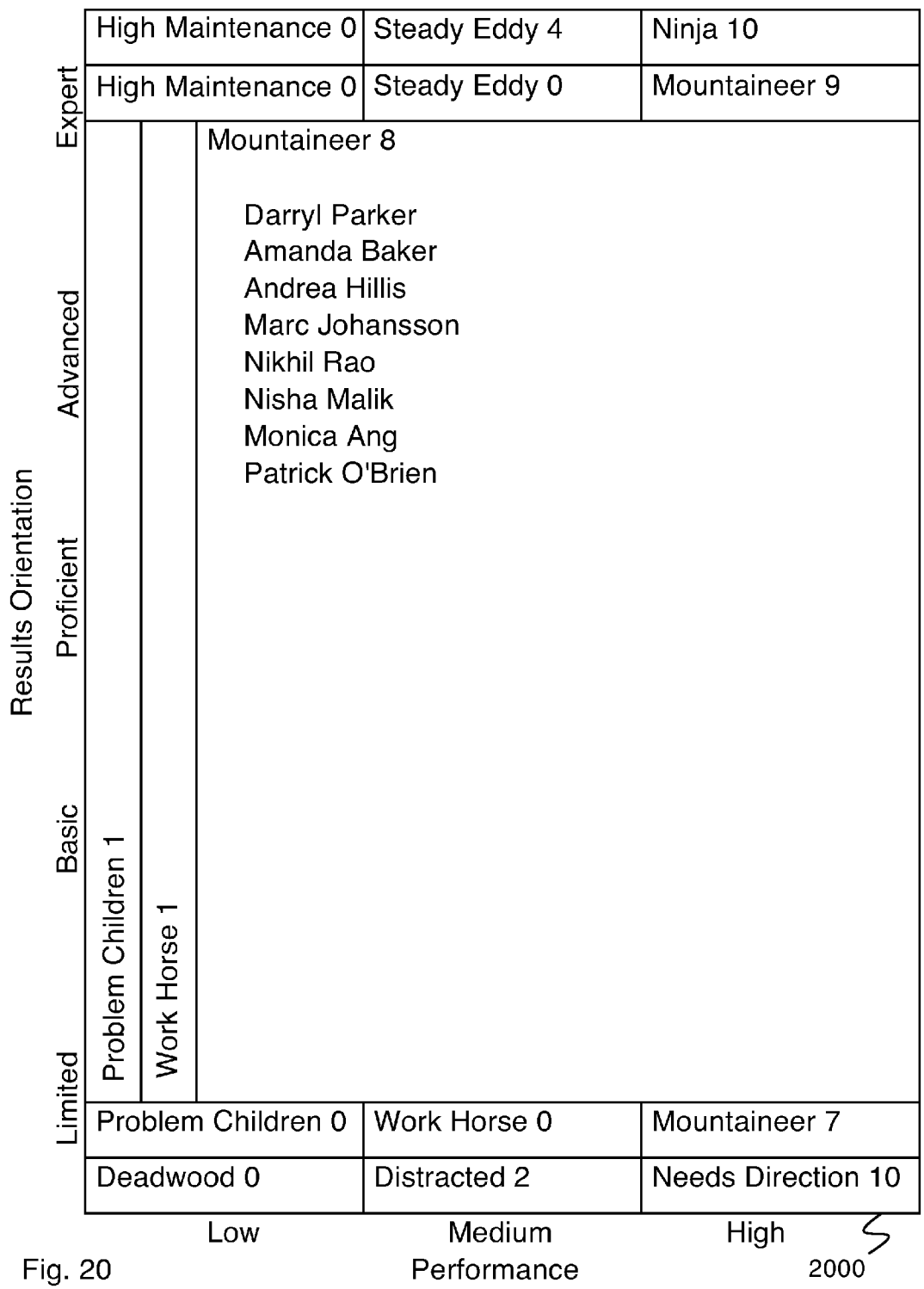
FIG. 20 is a diagram illustrating an embodiment of a report with an expanded matrix object.

FIG. 20 is a diagram illustrating an embodiment of a report with an expanded matrix object. In some embodiments, report 2000 comprises report 1100 of FIG. 11 with an expanded matrix object. In the example shown, the expanded matrix object is shown expanded, with all other matrix objects shown modified.

Figure 21:
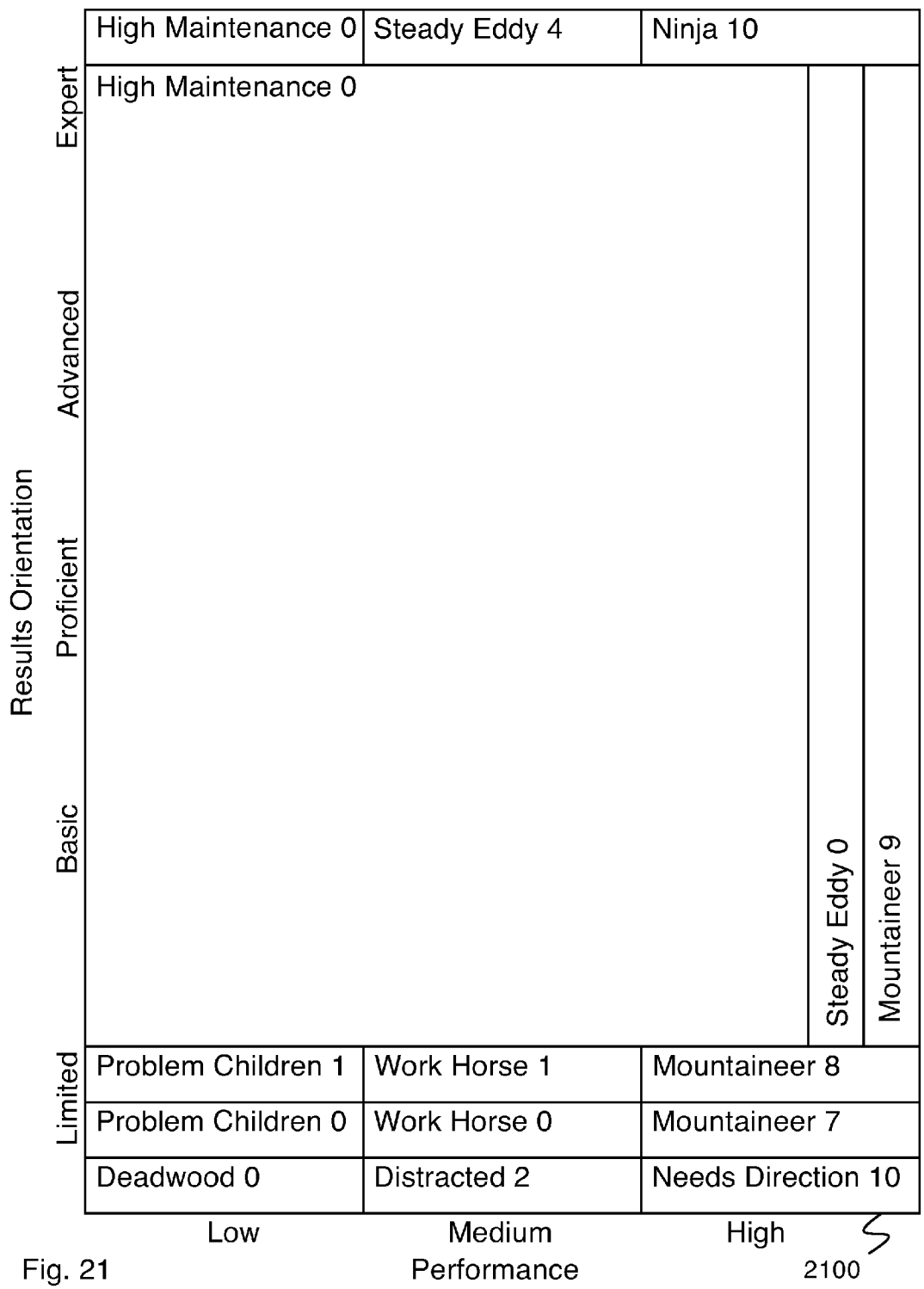
FIG. 21 is a diagram illustrating an embodiment of a report with an expanded matrix object.

FIG. 21 is a diagram illustrating an embodiment of a report with an expanded matrix object. In some embodiments, report 2100 comprises report 1100 of FIG. 11 with an expanded matrix object. In the example shown, the expanded matrix object is shown expanded, with all other matrix objects shown modified.

Figure 22:
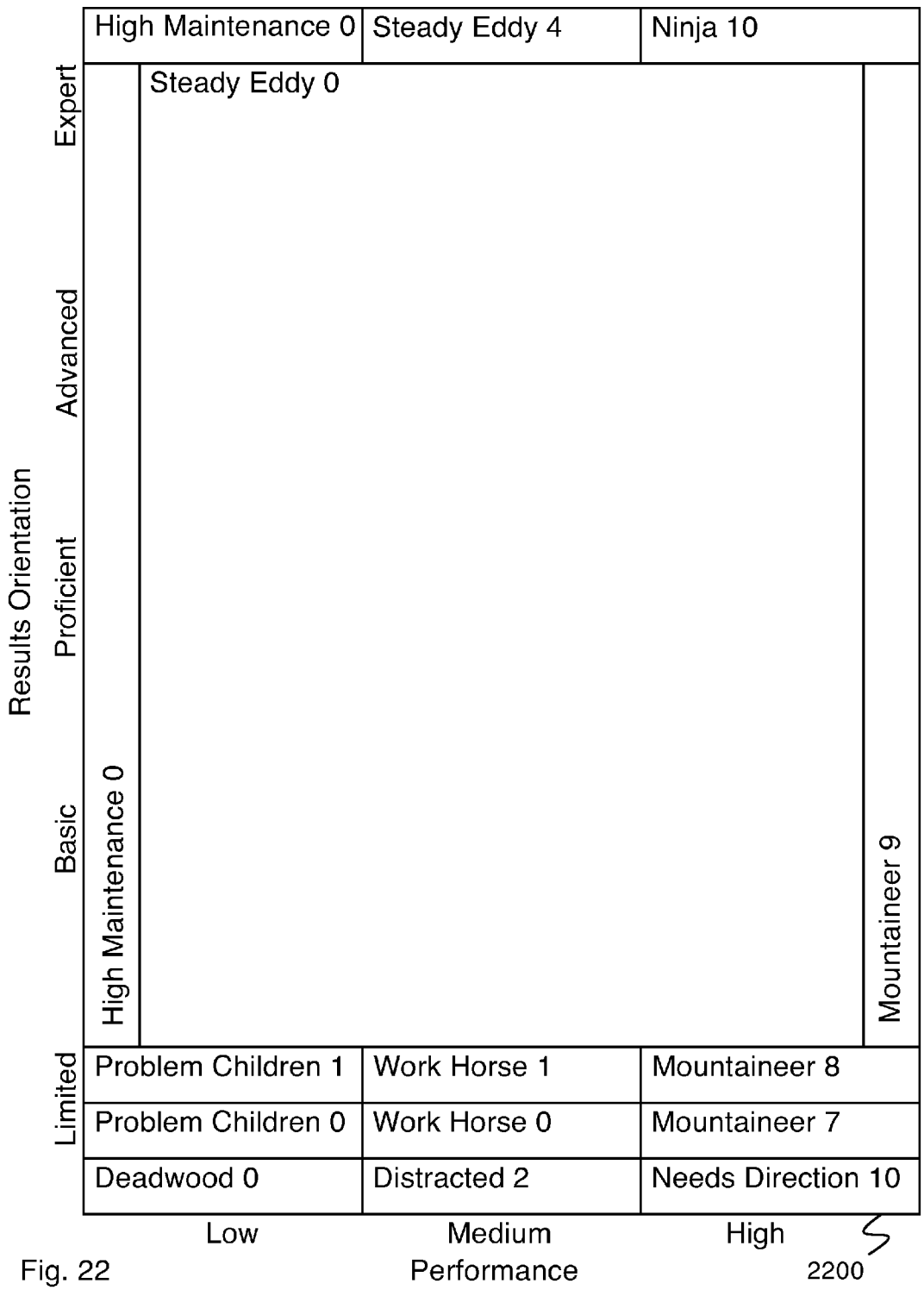
FIG. 22 is a diagram illustrating an embodiment of a report with an expanded matrix object.

FIG. 22 is a diagram illustrating an embodiment of a report with an expanded matrix object. In some embodiments, report 2200 comprises report 1100 of FIG. 11 with an expanded matrix object. In the example shown, the expanded matrix object is shown expanded, with all other matrix objects shown modified.

Figure 23:
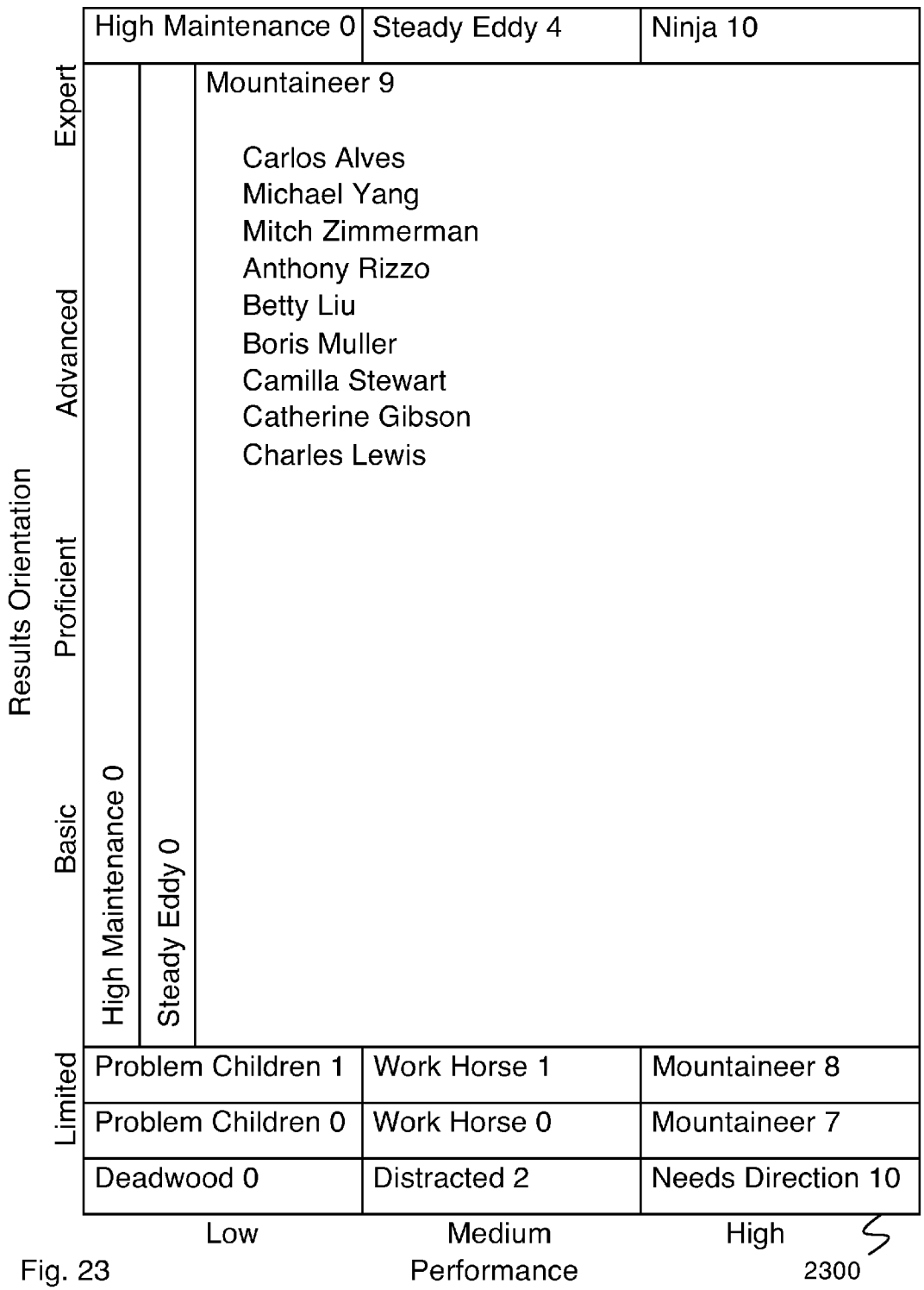
FIG. 23 is a diagram illustrating an embodiment of a report with an expanded matrix object.

FIG. 23 is a diagram illustrating an embodiment of a report with an expanded matrix object. In some embodiments, report 2300 comprises report 1100 of FIG. 11 with an expanded matrix object. In the example shown, the expanded matrix object is shown expanded, with all other matrix objects shown modified.

Figure 24:
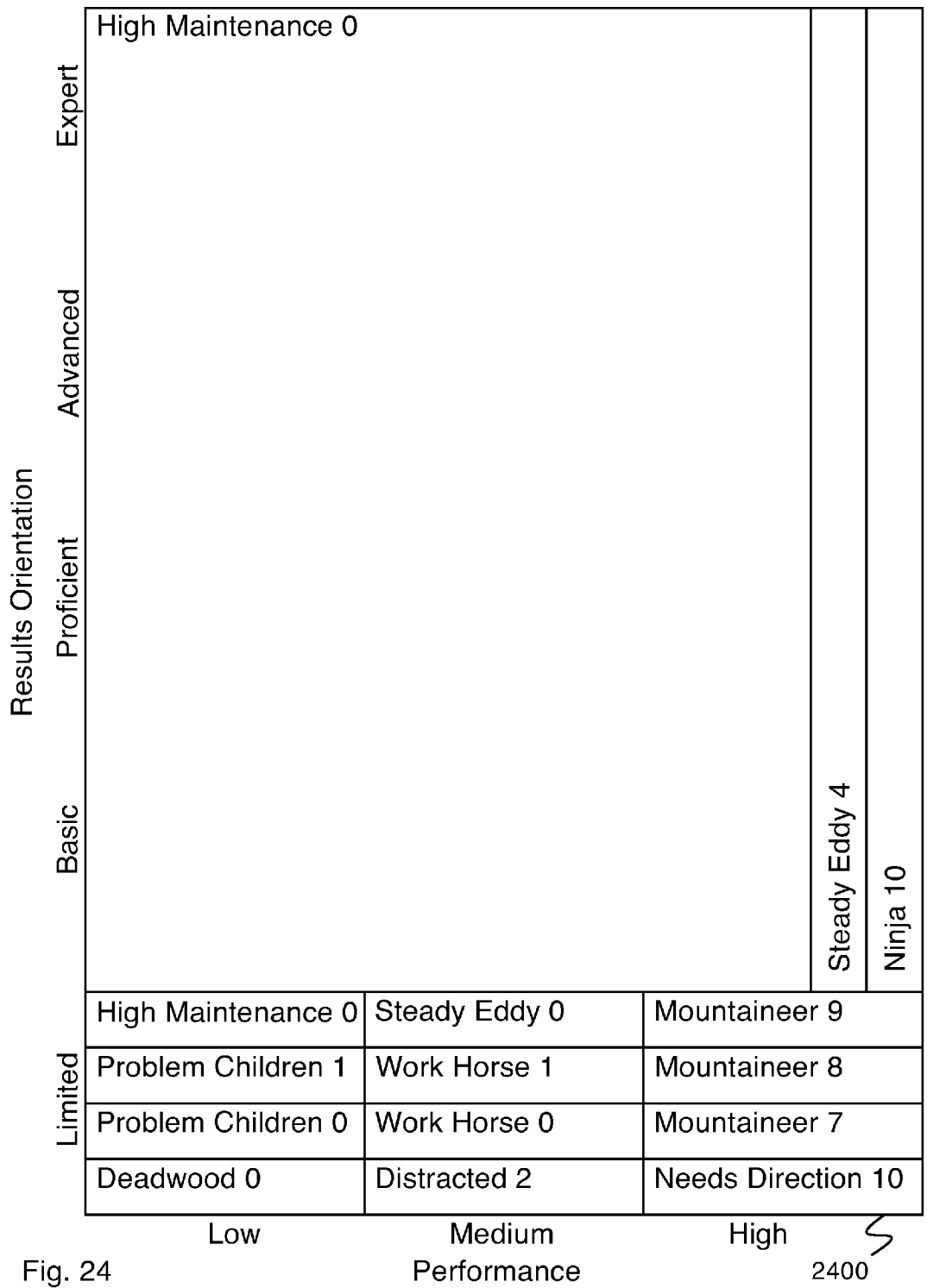
FIG. 24 is a diagram illustrating an embodiment of a report with an expanded matrix object.

FIG. 24 is a diagram illustrating an embodiment of a report with an expanded matrix object. In some embodiments, report 2400 comprises report 1100 of FIG. 11 with an expanded matrix object. In the example shown, the expanded matrix object is shown expanded, with all other matrix objects shown modified.

Figure 25:
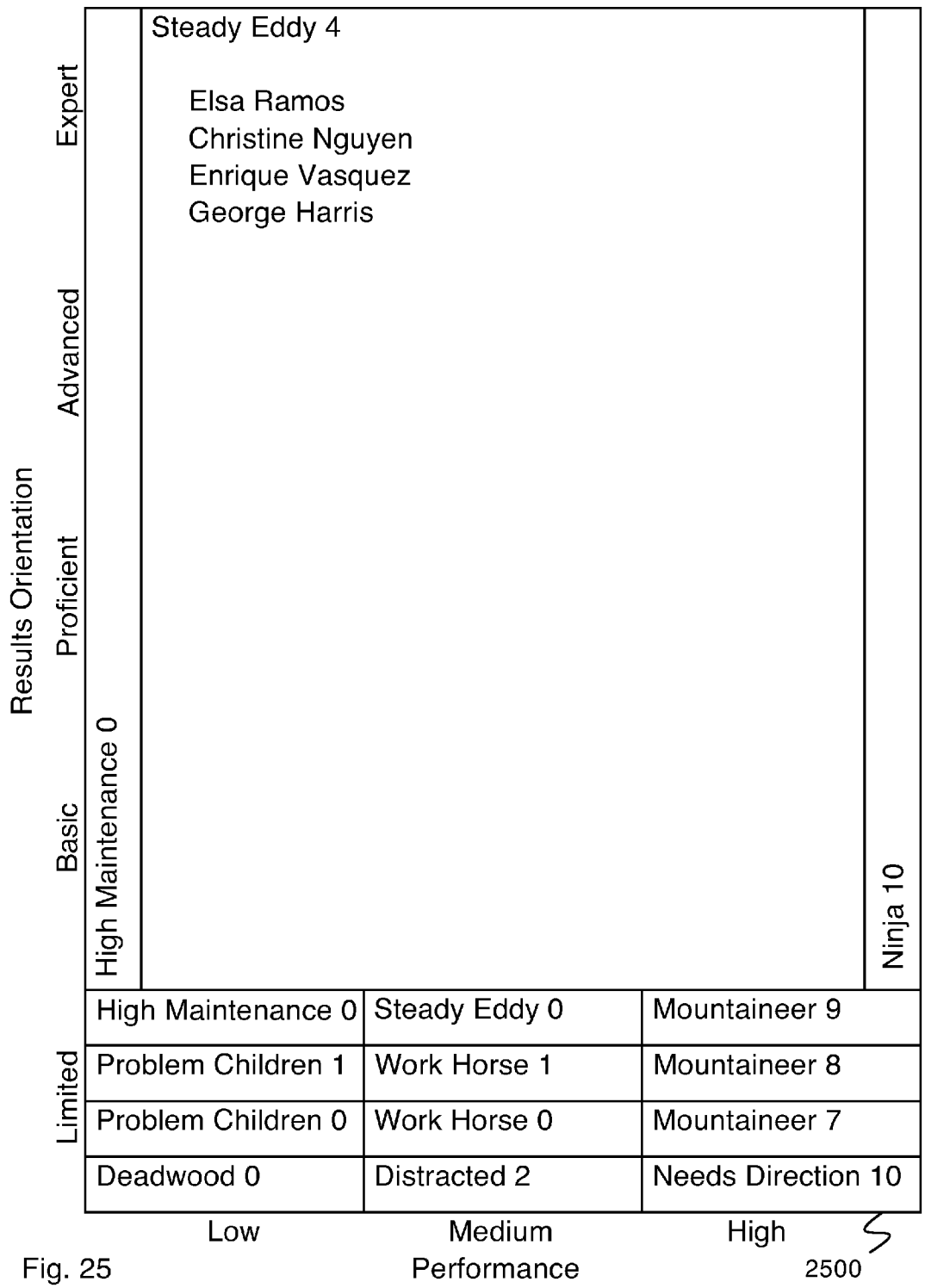
FIG. 25 is a diagram illustrating an embodiment of a report with an expanded matrix object.

FIG. 25 is a diagram illustrating an embodiment of a report with an expanded matrix object. In some embodiments, report 2500 comprises report 1100 of FIG. 11 with an expanded matrix object. In the example shown, the expanded matrix object is shown expanded, with all other matrix objects shown modified.

Figure 26:
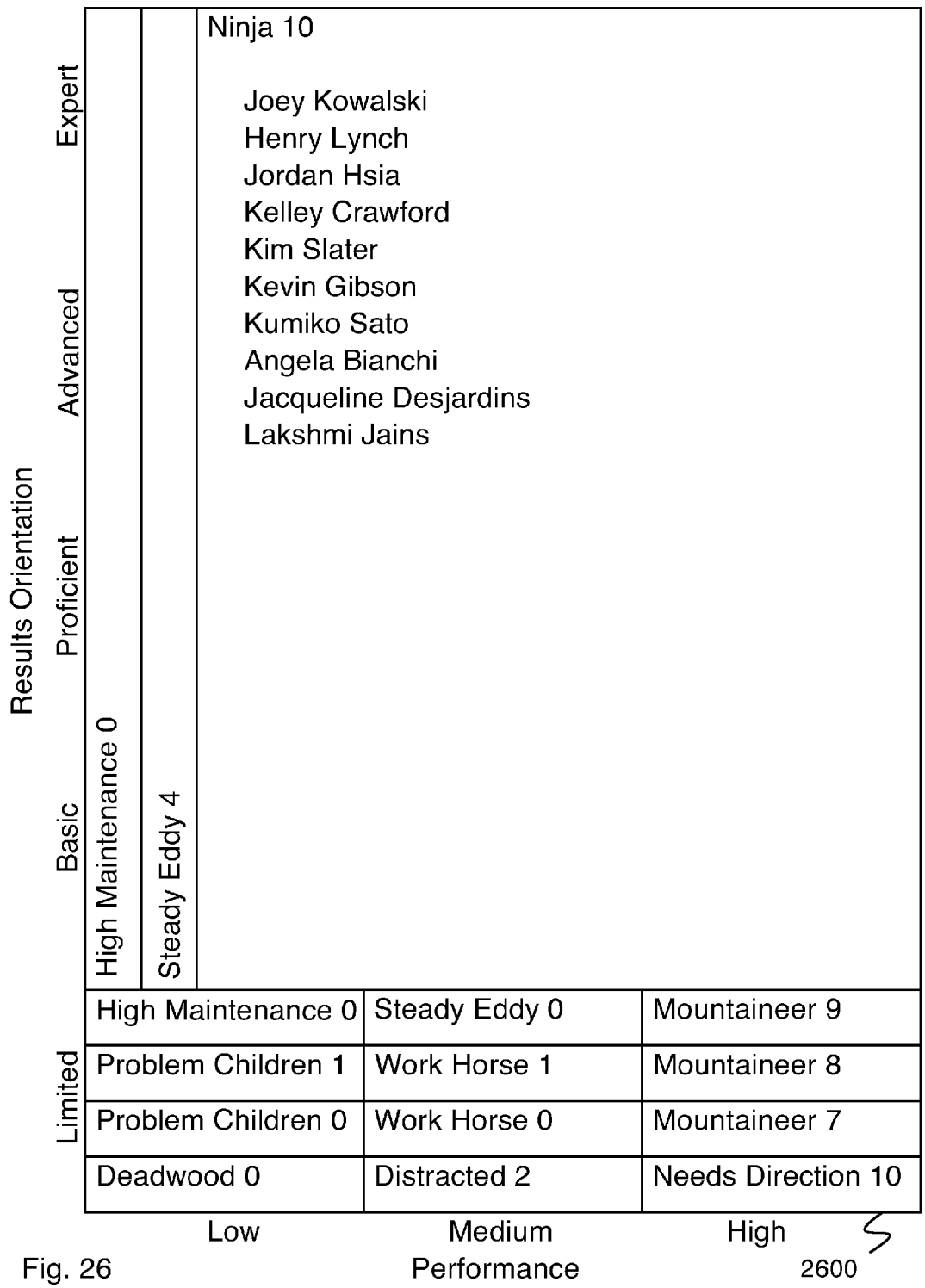
FIG. 26 is a diagram illustrating an embodiment of a report with an expanded matrix object.

FIG. 26 is a diagram illustrating an embodiment of a report with an expanded matrix object. In some embodiments, report 2600 comprises report 1100 of FIG. 11 with an expanded matrix object. In the example shown, the expanded matrix object is shown expanded, with all other matrix objects shown modified.

Figure 27:
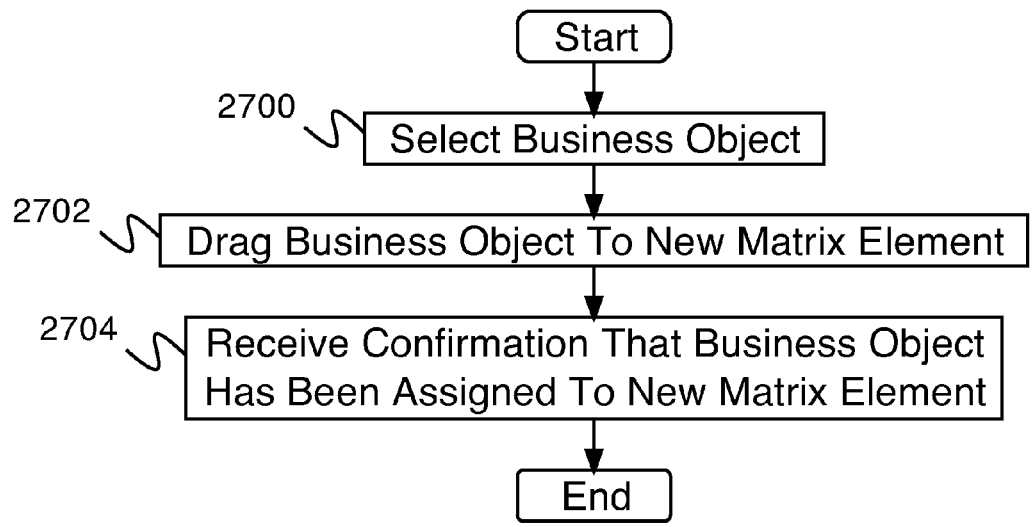
FIG. 27 is a flow diagram illustrating an embodiment of a process for assigning a business object to a new matrix element.

FIG. 27 is a flow diagram illustrating an embodiment of a process for assigning a business object to a new matrix element. In some embodiments, the process of FIG. 27 is executed by a database system user (e.g., database system user 102 of FIG. 1). In some embodiments, the process of FIG. 27 is used to assign a business object (e.g., a business object shown in a matrix element of report 400 of FIG. 4) to a new matrix element. In various embodiments, the process of FIG. 27 is used to assign an unplotted business object (e.g., an unplotted business object as shown in report 600 of FIG. 6) to a matrix element or vice versa. In the example shown, in 2700, a business object is selected. In some embodiments, selecting a business object comprises clicking on it (e.g., clicking a mouse, touchscreen, or other appropriate user interface device). In some embodiments, tapping on an object is used as a means of selection for touchscreens (e.g., a screen of a smartphone or a tablet). In some embodiments, selecting a business object comprises clicking and holding on it (e.g., clicking and not releasing a mouse, touchscreen, or other appropriate user interface device). In various embodiments, the business object is selected using cutting and pasting, clicking the object and clicking in the matrix element, and any other appropriate selection manner. In various embodiments, multiple objects are selected to be moved, dragged, or assigned, or any other appropriate action. In 2702, the business object is dragged to the new matrix object (e.g., dragged with the mouse, touchscreen, or other appropriate user interface device). In various embodiments, a plurality of objects are dragged or moved to a new matrix element or off of the matrix. In 2704, confirmation that the business object has been assigned to the new matrix element is received. In various embodiments, confirmation that the business object has been assigned to the new matrix element comprises a visual display that the business object is now assigned to the new matrix element, display of a text box confirming that the business object is now assigned to the new matrix element, an audio indication that the operation was successful, or any other appropriate confirmation that the business object has been assigned to the new matrix element. In some embodiments, the matrix element count is incremented. In some embodiments, the object label is visually seen in the new matrix element. In various embodiments, a plurality of objects are dragged or moved to a new matrix element or off of the matrix.

In some embodiments, an object is moved from one matrix element to another matrix element. In some embodiments, the object is automatically associated with an attribute (e.g., an attribute associated with a row or a column of the matrix or with the matrix element). In various embodiments, the object is moved using a drag and drop operation, by clicking on the object and clicking on the matrix element, by cutting and pasting, or any other appropriate movement operation.

In some embodiments, dragging and dropping are both done when a matrix element is expanded. For example, when a matrix element is expanded, a user is able to drag and drop a set of objects from the expanded matrix element onto a non-expanded matrix element. The expanded element stays expanded. The non-expanded element(s) stay non-expanded. In various embodiments, the objects are made no longer visible in the expanded element, partially visible, or any other appropriate visibility. This enables quick selection of another subset of objects in the expanded matrix element (e.g., to be moved to another non-expanded matrix element). In some embodiments, this enables users to see the details of the expanded matrix element while simultaneously sorting through it, moving objects to other matrix elements, without having to repeatedly expand/compress or pan around the display. In some embodiments, the counts in the matrix elements update themselves giving confirmation that the move was successful, but no resizing of the matrix elements happens.

Figure 28:
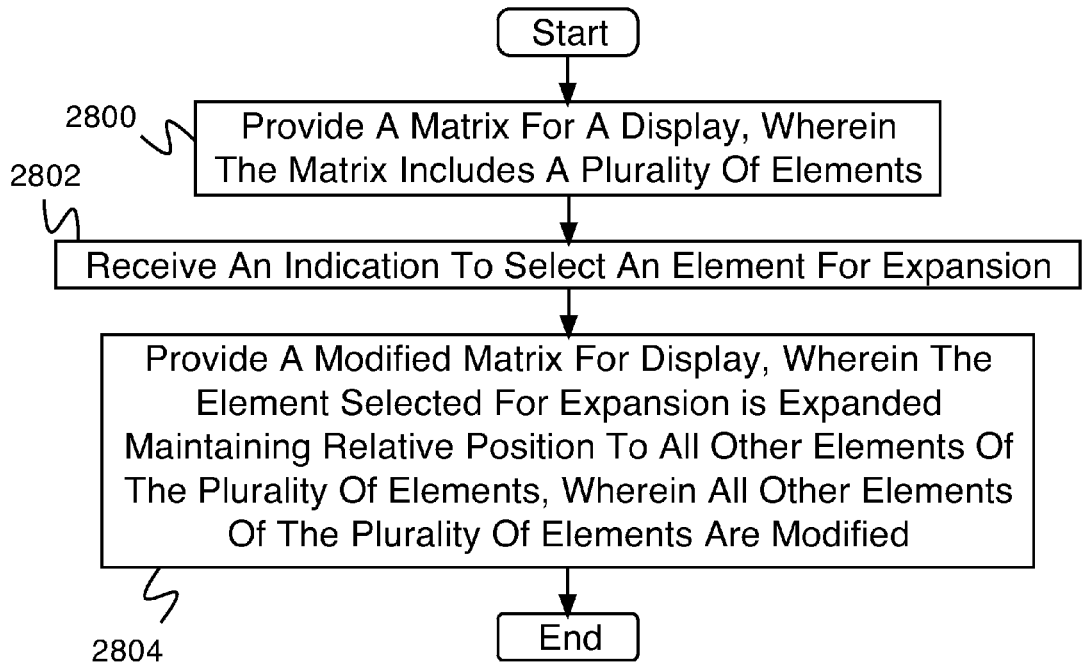
FIG. 28 is a flow diagram illustrating an embodiment of a process for displaying data.

FIG. 28 is a flow diagram illustrating an embodiment of a process for displaying data. In some embodiments, the process of FIG. 28 is carried out by a database system (e.g., database system 104 of FIG. 1). In 2800, a matrix is provided for a display, wherein the matrix includes a plurality of elements. In 2802, an indication is received to select an element for expansion. In 2804, a modified matrix is provided for display, wherein the element selected for expansion is expanded maintaining relative position to all other elements of the plurality of elements, wherein all other elements of the plurality of elements are modified.

Figure 29:
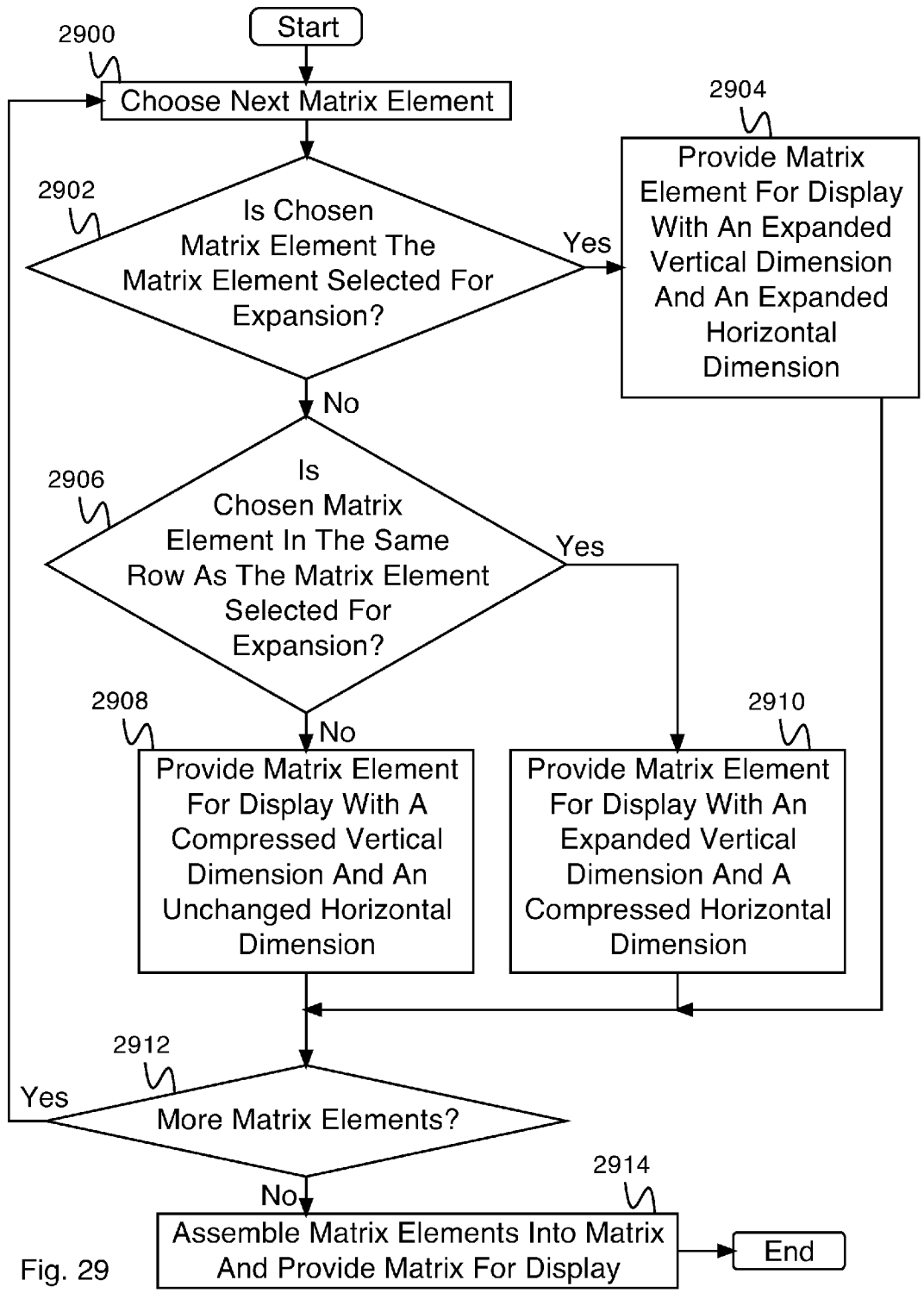
FIG. 29 is a flow diagram illustrating an embodiment of a process for providing a modified matrix for display.

FIG. 29 is a flow diagram illustrating an embodiment of a process for providing a modified matrix for display. In some embodiments, the process of FIG. 29 implements 2804 of FIG. 28. In the example shown, in 2900, the next matrix element is chosen. In some embodiments, the next matrix element comprises the first matrix element. In 2902, it is determined whether the chosen matrix element is the matrix element selected for expansion (e.g., the matrix element for which an indication to select for expansion is received in 2802 of FIG. 28). If the chosen element is determined to be the matrix element selected for expansion, control passes to 2904. In 2904, the matrix element is provided for display with an expanded vertical dimension and an expanded horizontal dimension. Control then passes to 2912. In the event that the chosen element is determined not to be the matrix element selected for expansion in 2902, control passes to 2906. In 2906, it is determined whether the chosen matrix element is in the same row as the matrix element selected for expansion. If it is determined that the chosen matrix element is not in the same row as the matrix element selected for expansion, control passes to 2908. In 2908, the matrix element is provided for display with a compressed vertical dimension and an unchanged horizontal dimension. Control then passes to 2912. In the event that the chosen matrix element is determined to be in the same row as the matrix element selected for expansion in 2906, control passes to 2910. In 2910, the matrix element is provided for display with an expanded vertical dimension and a compressed horizontal dimension. Control then passes to 2912. In 2912, it is determined whether there are more matrix elements. If there are more matrix elements, control passes to 2900. If there are no more matrix elements, control passes to 2914. In 2914, the matrix elements are assembled into a matrix and the matrix is provided for display.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for displaying data, comprising:
    an interface configured to receive an indication of a matrix element for expansion; and
    a processor configured to:
        provide a matrix for display, wherein the matrix includes a plurality of matrix elements, wherein the matrix includes a plurality of objects with attributes, wherein a set of objects from the plurality of objects is associated with each matrix element, wherein the set of objects associated with a matrix element comprises objects with attributes that correspond to X and Y axis values of the matrix element; and
        provide a modified matrix for display, in the event that the matrix element is selected for expansion, wherein the modified matrix for display includes a matrix element expanded and matrix elements compressed based at least in part on the matrix element selected;
        receive an indication to associate an object of the plurality of objects with a matrix element, wherein associating the object of the plurality of objects with the matrix element comprises updating attributes associated with the object with the corresponding X and Y axis values of the matrix element.

2. A system as in claim 1, wherein the matrix elements compressed comprises hiding the set of objects associated with the matrix element.

3. A system as in claim 1, wherein the plurality of objects further comprises objects not associated with any matrix element.

4. A system as in claim 3, wherein the objects not associated with any matrix element comprises elements not plotted.

5. A system as in claim 3, wherein the processor is configured to receive an indication to associate one or more of the objects not associated with any matrix element with a matrix element.

6. A system as in claim 1, wherein the indication to associate the object of the plurality of objects with a matrix element comprises an indication to associate one or more of the set of objects associated with a matrix element with no matrix element.

7. A system as in claim 1, wherein the indication to associate the object of the plurality of objects with a matrix element comprises an indication to associate one or more of the set of objects associated with a matrix element with another matrix element.

8. A system as in claim 1, wherein the indication comprises a drag and drop.

9. A system as in claim 1, wherein the indication comprises an indication to move an object from one matrix element to another matrix element.

10. A system as in claim 1, wherein the each matrix element is displayed at a specific location in the matrix and associated with a value of each axis of the matrix.

11. A system as in claim 1, wherein the X and Y axis of the matrix each represent a value range of an attribute.

12. A system as in claim 9, wherein the object is moved using a drag and drop operation.

13. A system as in claim 1, wherein each matrix element has a matrix element title and a number of objects associated with each matrix element.

14. A system as in claim 1, wherein associating the object of the plurality of objects with the matrix element comprises establishing a relationship to the matrix element.

15. A system as in claim 14, wherein the matrix element comprises one of the matrix elements expanded.

16. A system as in claim 14, wherein the matrix element comprises one of the matrix elements compressed.

17. A method for displaying data, comprising:
    receiving an indication of a matrix element for expansion; and
    providing, using a processor, a matrix for display, wherein the matrix includes a plurality of matrix elements, wherein the matrix includes a plurality of objects with attributes, wherein a set of objects from the plurality of objects is associated with each matrix element, wherein the set of objects associated with a matrix element comprises objects with attributes that correspond to X and Y axis values of the matrix element; and
    providing a modified matrix for display, in the event that the matrix element is selected for expansion, wherein the modified matrix for display includes a matrix element expanded and matrix elements compressed based at least in part on the matrix element selected;
    receiving an indication to associate an object of the plurality of objects with a matrix element, wherein associating the object of the plurality of objects with the matrix element comprises updating attributes associated with the object with the corresponding X and Y axis values of the matrix element.

18. A computer program product for displaying data, the computer program product being embodied in a non-transitory computer readable storage medium and comprising computer instructions for:
    receiving an indication of a matrix element for expansion; and
    providing a matrix for display, wherein the matrix includes a plurality of matrix elements, wherein the matrix includes a plurality of objects with attributes, wherein a set of objects from the plurality of objects is associated with each matrix element, wherein the set of objects associated with a matrix element comprises objects with attributes that correspond to X and Y axis values of the matrix element; and
    providing a modified matrix for display, in the event that the matrix element is selected for expansion, wherein the modified matrix for display includes a matrix element expanded and matrix elements compressed based at least in part on the matrix element selected;
    receive an indication to associate an object of the plurality of objects with a matrix element, wherein associating the object of the plurality of objects with the matrix element comprises updating attributes associated with the object with the corresponding X and Y axis values of the matrix element.

19. A system as in claim 1, wherein each of the matrix elements compressed comprises showing a matrix element title of the compressed matrix element and a number of objects associated with each compressed matrix element.

20. A system as in claim 1, wherein each of the matrix elements compressed comprises showing the matrix element title and the number of objects rotated ninety degrees.

\* \* \* \* \*